(12) United States Patent
Nakagawa

(10) Patent No.: US 12,136,345 B2
(45) Date of Patent: Nov. 5, 2024

(54) MOTION VECTOR IMAGING ALERT SYSTEM

(71) Applicant: SONY GROUP CORPORATION, Tokyo (JP)

(72) Inventor: Kei Nakagawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 456 days.

(21) Appl. No.: 17/440,164

(22) PCT Filed: Mar. 11, 2020

(86) PCT No.: PCT/JP2020/010506
§ 371 (c)(1),
(2) Date: Sep. 16, 2021

(87) PCT Pub. No.: WO2020/195822
PCT Pub. Date: Oct. 1, 2020

(65) Prior Publication Data
US 2022/0148432 A1 May 12, 2022

(30) Foreign Application Priority Data

Mar. 27, 2019 (JP) .................................. 2019-059698

(51) Int. Cl.
*G06K 9/00* (2022.01)
*G06V 10/75* (2022.01)
(Continued)

(52) U.S. Cl.
CPC ............ *G08G 1/166* (2013.01); *G06V 10/75* (2022.01); *G06V 20/44* (2022.01); *G06V 20/58* (2022.01); *B60Q 9/008* (2013.01)

(58) Field of Classification Search
CPC ........ G08G 1/166; G08G 1/165; G06V 20/44; G06V 20/56; G06V 20/588; G06V 10/75;
(Continued)

(56) References Cited

U.S. PATENT DOCUMENTS 6,250,148 B1 6/2001 Lynam
9,171,217 B2 * 10/2015 Pawlicki ............... B60W 10/04
(Continued)

FOREIGN PATENT DOCUMENTS

CN 104243803 A 12/2014
CN 106462976 A 2/2017
(Continued)

OTHER PUBLICATIONS

International Search Report and Written Opinion of PCT Application No. PCT/JP2020/010506, issued on Jun. 9, 2020, 11 pages of ISRWO.

*Primary Examiner* — Gregory A Morse
*Assistant Examiner* — Kevin M Coomber
(74) *Attorney, Agent, or Firm* — CHIP LAW GROUP

(57) ABSTRACT

An imaging system of the present disclosure includes: an event detection sensor that detects an event; an object recognition unit that performs recognition processing for an object detected as the event on the basis of an event signal output from the event detection sensor; a motion vector estimation unit that estimates a motion vector of the object on the basis of a recognition result by the object recognition unit; and a control unit that outputs warning information for warning that a dangerous state has occurred on the basis of an estimation result by the motion vector estimation unit.

13 Claims, 19 Drawing Sheets

(51) Int. Cl.
*G06V 20/40* (2022.01)
*G06V 20/58* (2022.01)
*G08G 1/16* (2006.01)
*B60Q 9/00* (2006.01)

(58) Field of Classification Search
CPC .......... G06V 20/58; H04N 23/00; B60R 1/22; B60R 2300/70; B60R 1/00; B60Q 9/008; G06T 7/215
See application file for complete search history.

(56) References Cited

U.S. PATENT DOCUMENTS

| | | | |
|---|---|---|---|
| 9,191,634 B2 * | 11/2015 | Schofield | G06V 20/584 |
| 10,109,057 B2 * | 10/2018 | Benosman | G06T 7/73 |
| 10,522,039 B2 * | 12/2019 | Park | B60W 40/02 |
| 2012/0257789 A1 | 10/2012 | Lee | |
| 2017/0053407 A1 | 2/2017 | Benosman et al. | |
| 2017/0351922 A1 | 12/2017 | Campbell | |

FOREIGN PATENT DOCUMENTS

| | | | | |
|---|---|---|---|---|
| CN | 107406071 A | | 11/2017 | |
| CN | 108692699 A | | 10/2018 | |
| FR | 3020699 A1 | | 11/2015 | |
| JP | 06-314340 A | | 11/1994 | |
| JP | 11-232465 A | | 8/1999 | |
| JP | 2006-279897 A | | 10/2006 | |
| JP | 2008046845 A | * | 2/2008 | |
| JP | 2013-041481 A | | 2/2013 | |
| JP | 2013-079937 A | | 5/2013 | |
| JP | 2016151770 A | * | 8/2016 | ............. B60Q 5/005 |
| JP | 2017-521746 A | | 8/2017 | |
| JP | 2018-097644 A | | 6/2018 | |
| WO | 2015/166176 A | | 11/2015 | |
| WO | WO-2016148825 A1 | | 9/2016 | |
| WO | WO-2018110402 A1 | * | 6/2018 | ............. B60R 21/00 |

* cited by examiner

MOTION VECTOR IMAGING ALERT SYSTEM

CROSS REFERENCE TO RELATED APPLICATIONS

This application is a U.S. National Phase of International Patent Application No. PCT/JP2020/010506 filed on Mar. 11, 2020, which claims priority benefit of Japanese Patent Application No. JP 2019-059698 filed in the Japan Patent Office on Mar. 27, 2019. Each of the above-referenced applications is hereby incorporated herein by reference in its entirety.

TECHNICAL FIELD

The present disclosure relates to an imaging system.

BACKGROUND ART

As one of event driven imaging devices, there is an asynchronous imaging device called Dynamic Vision Sensor (DVS). The asynchronous imaging device can detect, as an event, that a change in brightness in a pixel that photoelectrically converts incident light exceeds a predetermined threshold value. Thus, this kind of asynchronous imaging device can be called an event detection sensor. The event detection sensor conventionally is mounted on a vehicle and used as an event-based visual sensor for monitoring a traveling road surface (see, for example, Patent Document 1).

CITATION LIST

Patent Document

Patent Document 1: Japanese Patent Application Laid-Open No. 2013-79937

SUMMARY OF THE INVENTION

Problems to be Solved by the Invention

A danger may be encountered in which another vehicle suddenly interrupts in front of a subject vehicle during travel of the subject vehicle. At this time, it is desired to be able to predict such a dangerous situation in advance from a viewpoint of preventing collision accidents and the like and maintaining safe vehicle running.

An object of the present disclosure is to provide an imaging system capable of predicting (in advance) that a dangerous state occurs that hinders safe driving.

Solutions to Problems

An imaging system of the present disclosure for achieving the object described above includes:
  an event detection sensor that detects an event;
  an object recognition unit that performs recognition processing for an object detected as the event on the basis of an event signal output from the event detection sensor;
  a motion vector estimation unit that estimates a motion vector of the object on the basis of a recognition result by the object recognition unit; and
  a control unit that outputs warning information for warning that a dangerous state has occurred on the basis of an estimation result by the motion vector estimation unit.

MODE FOR CARRYING OUT THE INVENTION

Figure 1:
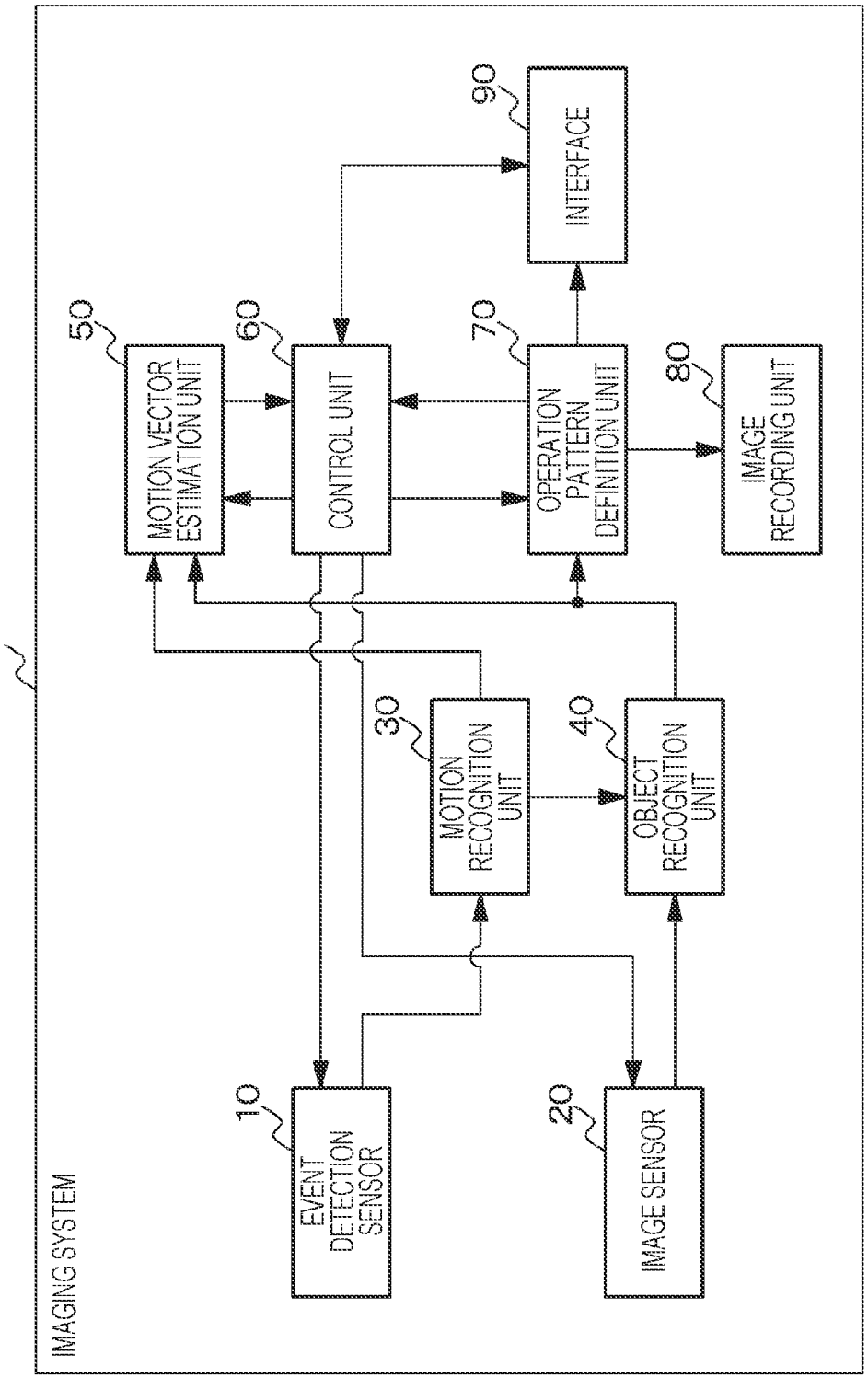
FIG. 1 is a block diagram illustrating an example of a system configuration of an imaging system according to an embodiment of the present disclosure.

Hereinafter, modes for carrying out the technology of the present disclosure (hereinafter, referred to as "embodiments") will be described in detail using the drawings. The technology of the present disclosure is not limited to the embodiments. In the following description, the same reference signs will be used for the same elements or elements having the same function, and redundant description will be omitted.

<General Description of Imaging System of Present Disclosure>

In an imaging system of the present disclosure, an event detection sensor can include an asynchronous imaging device that detects as an event that a change in brightness in a pixel that photoelectrically converts incident light exceeds a predetermined threshold value. Then, the imaging system of the present disclosure is preferably mounted and used on a mobile body.

In the imaging system of the present disclosure including the above-described preferable configuration, the motion vector estimation unit can be configured to detect the motion vector between the imaging frames and estimate the motion of an object in a screen.

Furthermore, the imaging system of the present disclosure including the above-described preferable configuration can include an image sensor that performs imaging at a predetermined frame rate. Then, an object recognition unit can be configured to perform event recognition processing using the image data in a frame format output from the image sensor.

Furthermore, in the imaging system of the present disclosure including the above-described preferable configuration, the control unit can be configured to determine vehicle interruption as a dangerous state. Furthermore, the control unit can be configured to detect the vehicle interruption on the basis of a movement vector of a center of gravity of the object. Specifically, the control unit detects the vehicle interruption when the movement vector of the center of gravity of the object is toward a center of an angle of view and a magnitude of the movement vector is a predetermined threshold value.

Furthermore, in the imaging system of the present disclosure including the above-described preferable configuration, the control unit can be configured to detect the vehicle interruption on the basis of a ratio of the object occupying an angle of view of the event detection sensor, and a movement vector of a center of gravity of the object. Specifically, the control unit can be configured to detect the vehicle interruption when the ratio of the object occupying the angle of view of the event detection sensor is greater than or equal to a certain ratio, and the movement vector of the center of gravity of the object is toward a center of the angle of view, and a magnitude of the movement vector is a predetermined threshold value.

Furthermore, in the imaging system of the present disclosure including the above-described preferable configuration, the control unit can be configured to control a characteristic of the event detection sensor when the ratio of the object occupying the angle of view of the event detection sensor is greater than or equal to a certain ratio, and the movement vector of the center of gravity of the object is toward a center of the angle of view, and a magnitude of the movement vector is a predetermined threshold value. As the characteristics of the event detection sensor, the resolution of the event detection sensor or a detection sensitivity of event detection can be exemplified.

Embodiment of Present Disclosure

<Configuration Example of Imaging System According to Embodiment>

FIG. 1 is a block diagram illustrating an example of a system configuration of an imaging system according to an embodiment of the present disclosure.

As illustrated in FIG. 1, an imaging system 1 according to the embodiment of the present disclosure includes an event detection sensor 10, an image sensor 20, a motion recognition unit 30, an object recognition unit 40, a motion vector estimation unit 50, a control unit 60, and an operation pattern definition unit 70, a recording unit 80, and an interface 90. The imaging system 1 according to the present embodiment can be mounted and used on a mobile body such as a vehicle.

Taking the case of being mounted on a vehicle as an example, the imaging system 1 is arranged and used at a predetermined position of the vehicle, for example, at least one position of the vehicle's front nose, side mirror, rear bumper, back door, or the upper part of the windshield in the vehicle interior. Details of application examples of a technology according to the present disclosure (that is, the imaging system 1 according to the present embodiment) will be described later.

As the event detection sensor 10, an asynchronous imaging device called DVS can be used that detects as an event that a change in brightness in a pixel that photoelectrically converts the incident light exceeds a predetermined detection threshold value. The asynchronous imaging device is an imaging device that detects an event asynchronously with a vertical synchronization signal, as opposed to a synchronous imaging device that performs imaging in synchronization with the vertical synchronization signal. Details of the event detection sensor 10 including the asynchronous imaging device will be described later.

As the image sensor 20, a synchronous imaging device can be used that performs imaging at a predetermined frame rate in synchronization with a vertical synchronization signal and outputs image data in a frame format. As the synchronous imaging device, a Complementary Metal-Oxide-Semiconductor (CMOS) image sensor, a Charge-Coupled Device (CCD) sensor, or the like can be exemplified. Details of the image sensor 20 including the synchronous imaging device will be described later.

Figure 2A:
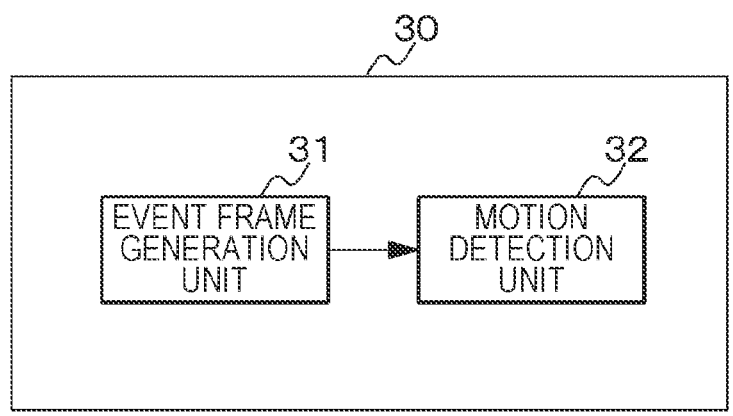
FIG. 2A is a block diagram illustrating an example of a configuration of a motion recognition unit in the imaging system.

The motion recognition unit 30 recognizes (detects) motion of an object on the basis of an event signal (event data) indicating occurrence of the event output from the event detection sensor 10. An example of a specific configuration of the motion recognition unit 30 is illustrated in FIG. 2A. The motion recognition unit 30 includes, for example, an event frame generation unit 31 and a motion detection unit 32.

The event frame generation unit 31 generates an event frame by framing how many events have occurred within a certain time period on the basis of the event signal output from the event detection sensor 10. The motion detection unit 32 performs motion detection between event frames framed by the event frame generation unit 31. Note that, the event frame generation unit 31 does not have to perform framing, that is, the motion recognition unit 30 may directly receive the event signal asynchronously output, to perform motion detection.

Figure 2B:
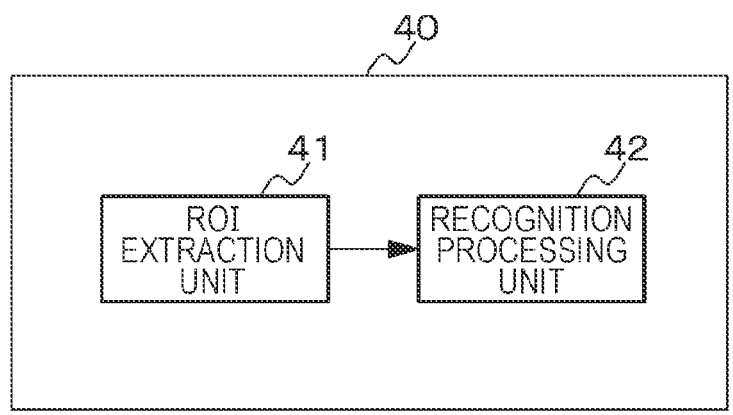
FIG. 2B is a block diagram illustrating an example of a configuration of an object recognition unit in the imaging system.

The object recognition unit 40 performs recognition processing for the object detected as an event on the basis of a result of the motion detection given by the motion recognition unit 30. The object recognition unit 40 further performs object recognition processing on the basis of the image data on a frame basis given by the image sensor 20. An example of a specific configuration of the object recognition unit 40 is illustrated in FIG. 2B. The object recognition unit 40 includes, for example, an ROI extraction unit 41 and a recognition processing unit 42.

The ROI extraction unit 41 extracts a specific area for performing object recognition, that is, extracts a Region Of Interest (ROI). The recognition processing unit 42 performs recognition processing for the object on the basis of data of the area extracted by the ROI extraction unit 41. For object recognition in the recognition processing unit 42, it is possible to use a pattern recognition technology by machine learning with a neural network or the like, for example, a technology for performing image recognition by comparing a feature point of an image given as teacher data with a feature point of an imaged subject image.

Under the control of the control unit 60, the motion vector estimation unit 50 detects the motion vector of an object (for example, a vehicle) between imaging frames (event frames) on the basis of the recognition result by the object recognition unit 40, and estimates the motion of the object in the screen.

The control unit 60 includes, for example, a processor (CPU) and controls the event detection sensor 10 and the image sensor 20. Various information such as vehicle speed is given to the control unit 60 via the interface 90 from a vehicle control system 7000 (see FIG. 18) that is an example of a mobile body control system to which the technology according to the present disclosure described later can be applied.

On the basis of the estimation result by the motion vector estimation unit 50, the control unit 60 further detects that a dangerous state has occurred such as a sudden interruption of another vehicle in front of the subject vehicle, during traveling of the subject vehicle. Then, when detecting that the dangerous state has occurred, the control unit 60 outputs warning information to warn that fact, and transmits the vehicle control system 7000 described above via the interface 90.

When the warning information notification is received from the control unit 60, in the vehicle control system 7000, as an example, control is performed such as an alert display on a display or the like, an alarm by sound, brake control, or the like to notify the driver that a dangerous state has occurred.

Under the control of the control unit 60, the operation pattern definition unit 70 uses a motion recognition result given by the motion recognition unit 30 and an object recognition result given by the object recognition unit 40 to detect the traveling state of a vehicle as an example of a mobile body, and the like.

The information output from the operation pattern definition unit 70 is given to the control unit 60, and is stored in the storage unit 80 as necessary. Furthermore, the information output from the operation pattern definition unit 70 is supplied to the vehicle control system 7000 via the interface 90, as necessary.

Hereinafter, the details of the event detection sensor 10 and the image sensor 20 will be described.

<Configuration Example of Event Detection Sensor>

Figure 3:
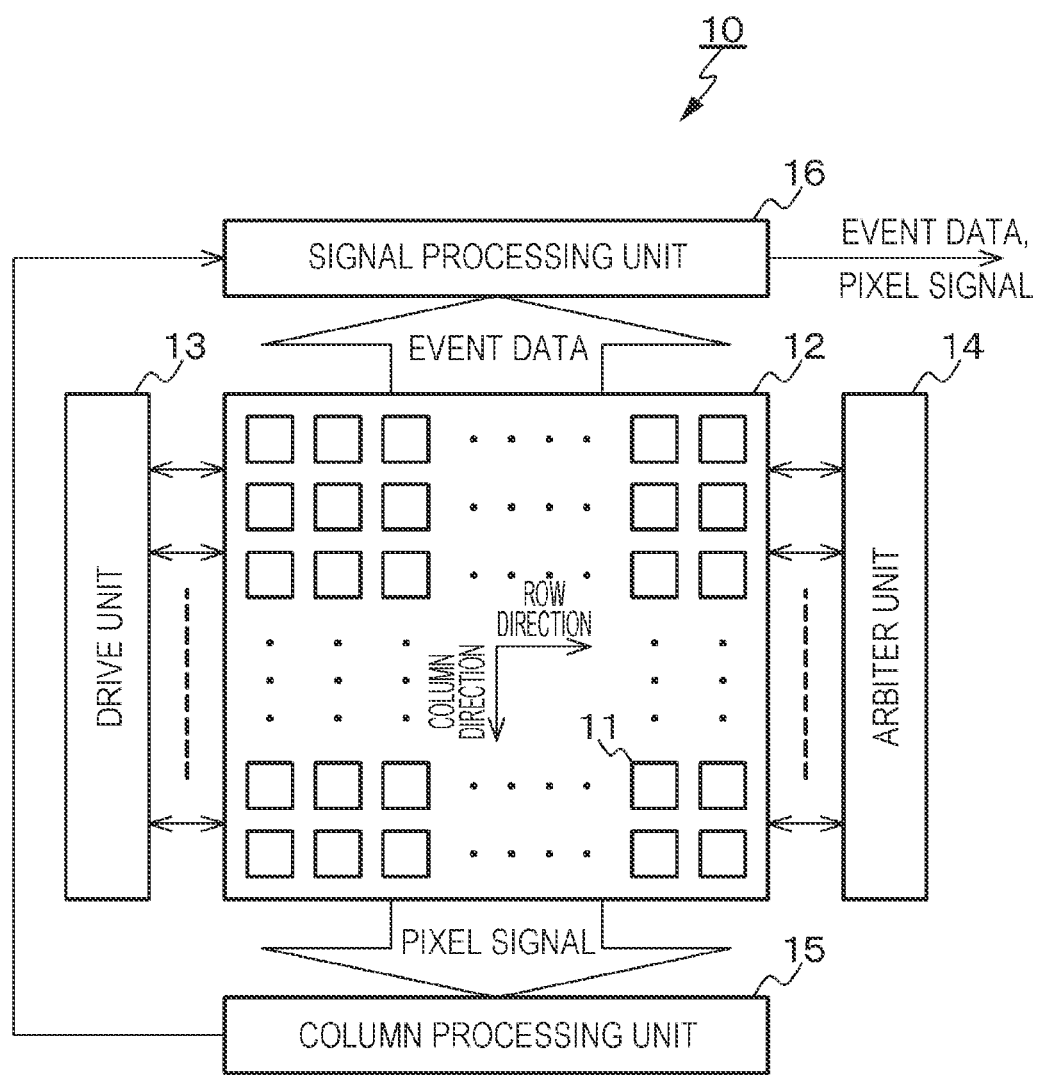
FIG. 3 is a block diagram illustrating an example of a configuration of an event detection sensor in the imaging system.

Hereinafter, the details of the event detection sensor 10 will be described. FIG. 3 is a block diagram illustrating an example of a configuration of the event detection sensor 10 in the imaging system 1 of the present disclosure having the configuration described above.

As illustrated in FIG. 3, the event detection sensor 10 includes a pixel array unit 12 in which a plurality of pixels 11 is two-dimensionally arranged in a matrix (array). Each of the plurality of pixels 11 generates as a pixel signal an analog signal having a voltage corresponding to a photocurrent as an electric signal generated by photoelectric conversion. Furthermore, each of the plurality of pixels 11 detects presence or absence of an event depending on whether or not a change exceeding a predetermined threshold value has occurred in the photocurrent corresponding to brightness of the incident light. In other words, each of the plurality of pixels 11 detects as an event that the change in brightness exceeds a predetermined threshold value.

In addition to the pixel array unit 12, the event detection sensor 10 includes a drive unit 13, an arbiter unit (arbitration unit) 14, a column processing unit 15, and a signal processing unit 16, as a peripheral circuit unit of the pixel array unit 12.

When detecting an event, each of the plurality of pixels 11 outputs a request for outputting event data indicating occurrence of the event to the arbiter unit 14. Then, in the case of receiving a response indicating permission for output of the event data from the arbiter unit 14, each of the plurality of pixels 11 outputs the event data to the drive unit 13 and the signal processing unit 16. Furthermore, the pixel 11 detecting the event outputs an analog pixel signal generated by photoelectric conversion to the column processing unit 15.

The drive unit 13 drives each pixel 11 of the pixel array unit 12. For example, the drive unit 13 drives the pixel 11 that detects the event and outputs the event data, and outputs the analog pixel signal of the pixel 11 to the column processing unit 15.

The arbiter unit 14 arbitrates a request for output of event data supplied from each of the plurality of pixels 11, and transmits a response based on the arbitration result (permission/non-permission of output of event data), and a reset signal for resetting event detection to the pixel 11.

The column processing unit 15 includes, for example, an analog-digital conversion unit including a set of analog-digital converters provided for each pixel column of the pixel array unit 12. As the analog-digital converter, for example, a single slope type analog-digital converter can be exemplified.

The column processing unit 15 performs processing of converting the analog pixel signal output from the pixel 11 of the pixel array unit 12 into a digital signal, for each pixel column of the pixel array unit 12. The column processing unit 15 can also perform Correlated Double Sampling (CDS) processing on the digitized pixel signal.

The signal processing unit 16 executes predetermined signal processing on the digitized pixel signal supplied from the column processing unit 15 and the event data output from the pixel array unit 12, and outputs the event data and pixel signal after the signal processing.

As described above, a change in the photocurrent generated in the pixel 11 can also be regarded as a change in the amount of light (change in brightness) of light incident on the pixel 11. Thus, it can be said that the event is a change in the amount of light (change in brightness) of the pixel 11 that exceeds a predetermined threshold value. The event data indicating the occurrence of the event includes at least position information such as coordinates representing a position of the pixel 11 in which the change in the amount of light as an event has occurred. The event data can include a polarity of the change in the amount of light in addition to the position information.

For a series of event data output at a timing when an event occurs from the pixel 11, it can be said that the event data implicitly includes time information indicating a relative time when the event has occurred as long as an interval between the event data is maintained as it is when the event has occurred. However, if the interval between the event data is no longer maintained as it is when the event has occurred, due to that, the event data is stored in a memory, or the like, the time information implicitly included in the event data is lost. For that reason, before the interval between the event data is no longer maintained as it is when the event has occurred, the signal processing unit 16 includes, in the event data, time information indicating the relative time when the event has occurred, such as a time stamp.

[Configuration Example of Pixel Array Unit]

Figure 4:
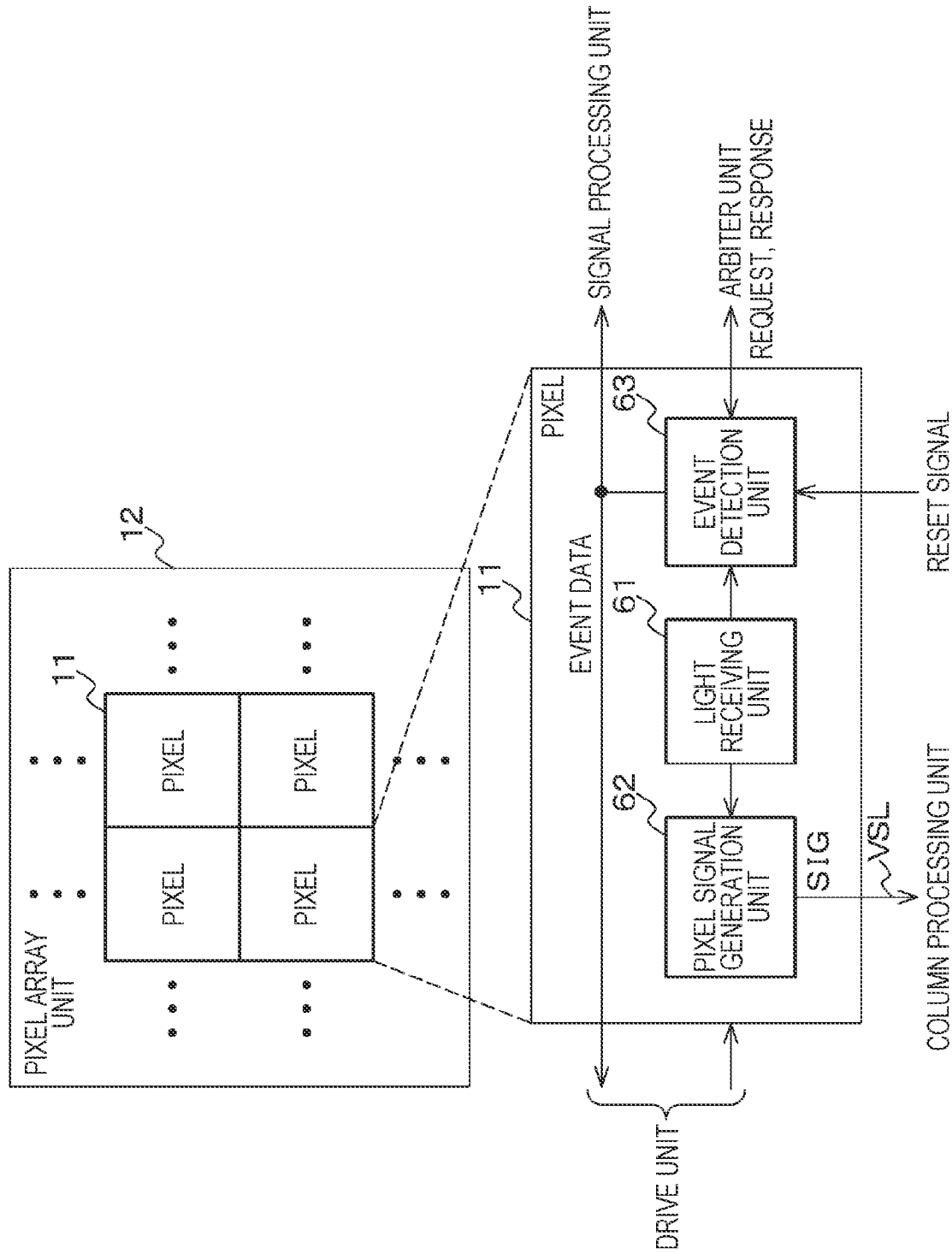
FIG. 4 is a block diagram illustrating an example of a configuration of a pixel array unit in the event detection sensor.

FIG. 4 is a block diagram illustrating an example of a configuration of the pixel array unit 12 in the event detection sensor 10.

In the pixel array unit 12 in which the plurality of pixels 11 is two-dimensionally arranged in a matrix, each of the plurality of pixels 11 includes a light receiving unit 61, a pixel signal generation unit 62, and an event detection unit 63.

In the pixel 11 having the configuration described above, the light receiving unit 61 photoelectrically converts the incident light to generate a photocurrent. Then, the light receiving unit 61 supplies a signal of a voltage corresponding to the photocurrent generated by photoelectrically converting the incident light, to either the pixel signal generation unit 62 or the event detection unit 63 in accordance with control of the drive unit 13 (see FIG. 3).

The pixel signal generation unit 62 generates the signal of the voltage corresponding to the photocurrent supplied from the light receiving unit 61 as an analog pixel signal SIG. Then, the pixel signal generation unit 62 supplies the generated analog pixel signal SIG to the column processing unit 15 (see FIG. 3) via a vertical signal line VSL wired for each pixel column of the pixel array unit 12.

The event detection unit 63 detects presence or absence of an event depending on whether or not an amount of change in the photocurrent from each of the light receiving units 61 exceeds a predetermined threshold value. The event includes, for example, an on-event indicating that the amount of change in the photocurrent exceeds an upper limit threshold value and an off-event indicating that the amount of change falls below a lower limit threshold value. Furthermore, the event data indicating the occurrence of the event includes, for example, 1 bit indicating an on-event detection result, and 1 bit indicating an off-event detection result. Note that, the event detection unit 63 may be configured to detect only the on-event.

When an event occurs, the event detection unit 63 outputs a request for outputting event data indicating the occurrence of the event to the arbiter unit 14 (see FIG. 3). Then, in a case where a response to the request is received from the arbiter unit 14, the event detection unit 63 outputs the event data to the drive unit 13 and the signal processing unit 16.

[Circuit Configuration Example of Pixel]

Figure 5:
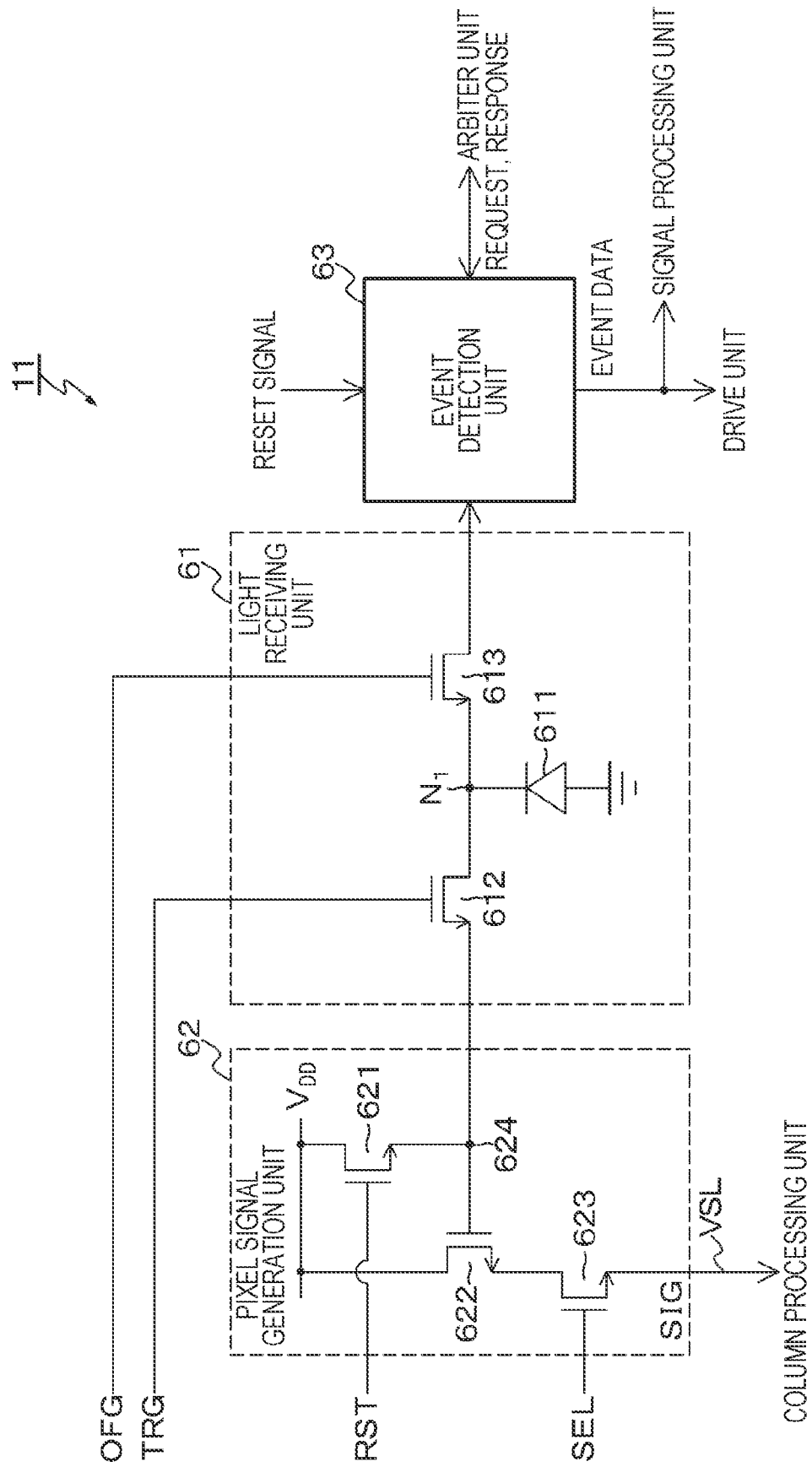
FIG. 5 is a circuit diagram illustrating an example of a circuit configuration of a pixel in the event detection sensor.

FIG. 5 is a circuit diagram illustrating an example of a circuit configuration of the pixel 11 of the pixel array unit 12 in the event detection sensor 10.

As described above, each of the plurality of pixels 11 includes the light receiving unit 61, the pixel signal generation unit 62, and the event detection unit 63.

In the pixel 11 having the configuration described above, the light receiving unit 61 includes a light receiving element (photoelectric conversion element) 611, a transfer transistor 612, and a transfer transistor 613. As the transfer transistor 612 and the transfer transistor 613, for example, an N-type Metal Oxide Semiconductor (MOS) transistor can be used. The transfer transistor 612 and the transfer transistor 613 are connected in series with each other.

The light receiving element 611 is connected between the ground and a common connection node $N_1$ of the transfer transistor 612 and the transfer transistor 613, and photoelectrically converts the incident light to generate electric charge of an amount of electric charge corresponding to the amount of the incident light.

A transfer signal TRG is supplied to the gate electrode of the transfer transistor 612 from the drive unit 13 illustrated in FIG. 3. The transfer transistor 612 is turned on in response to the transfer signal TRG, thereby supplying an electric signal generated by photoelectric conversion by the light receiving element 611 to the pixel signal generation unit 62.

A control signal OFG is supplied from the drive unit 13 to the gate electrode of the transfer transistor 613. The transfer transistor 613 is turned on in response to the control signal OFG, thereby supplying an electric signal generated by photoelectric conversion by the light receiving element 611 to the event detection unit 63. The electrical signal supplied to the event detection unit 63 is a photocurrent including the electric charge.

The pixel signal generation unit 62 includes a reset transistor 621, an amplification transistor 622, a selection transistor 623, and a floating diffusion layer 624. As the reset transistor 621, the amplification transistor 622, and the selection transistor 623, for example, an N-type MOS transistor can be used.

The electric charge photoelectrically converted by the light receiving element 611 of the light receiving unit 61 is supplied to the pixel signal generation unit 62 by the transfer transistor 612. The electric charge supplied from the light receiving unit 61 is accumulated in the floating diffusion layer 624. The floating diffusion layer 624 generates a voltage signal of a voltage value corresponding to the amount of electric charge of the accumulated electric charge. That is, the floating diffusion layer 624 is a charge-voltage conversion unit that converts electric charge into voltage.

The reset transistor 621 is connected between a power supply line of a power supply voltage $V_{DD}$ and the floating diffusion layer 624. A reset signal RST is supplied from the drive unit 13 to the gate electrode of the reset transistor 621. The reset transistor 621 is turned on in response to the reset signal RST, thereby initializing (resetting) the floating diffusion layer 624.

The amplification transistor 622 is connected in series with the selection transistor 623 between the power supply line of the power supply voltage $V_{DD}$ and the vertical signal line VSL. The amplification transistor 622 amplifies the voltage signal subjected to charge-voltage conversion in the floating diffusion layer 624.

A selection signal SEL is supplied from the drive unit 13 to the gate electrode of the selection transistor 623. The selection transistor 623 is turned on in response to the selection signal SEL, thereby outputting the voltage signal amplified by the amplification transistor 622 as the analog pixel signal SIG via the vertical signal line VSL to the column processing unit 15 (FIG. 3).

In the event detection sensor 10 including the pixel array unit 12 in which the pixels 11 having the configuration described above are two-dimensionally arranged, the drive unit 13 is instructed by the control unit 60 illustrated in FIG. 1 to start event detection. Then, when an instruction is given to start the event detection, the drive unit 13 drives the transfer transistor 613 by supplying the control signal OFG to the transfer transistor 613 of the light receiving unit 61, and causes the photocurrent corresponding to the electric charge generated by the light receiving element 611 to be supplied to the event detection unit 63.

Then, when an event is detected in a certain pixel 11, the drive unit 13 turns off the transfer transistor 613 of the pixel 11 and stops supplying the photocurrent to the event detection unit 63. Next, the drive unit 13 drives the transfer transistor 612 by supplying the transfer signal TRG to the transfer transistor 612, and causes the electric charge photoelectrically converted by the light receiving element 611 to be transferred to the floating diffusion layer 624.

In this way, the event detection sensor 10 including the pixel array unit 12 in which the pixels 11 having the configuration described above are two-dimensionally arranged outputs only the pixel signal of the pixel 11 in which the event is detected to the column processing unit 15. As a result, power consumption of the event detection sensor 10 and an amount of image processing can be reduced as compared with a case where the pixel signals of all pixels are output regardless of the presence or absence of an event.

Note that, the configuration of the pixel 11 illustrated here is an example, and is not limited to this configuration example. For example, in a case where it is not necessary to output a pixel signal, a pixel configuration can be used that does not include the pixel signal generation unit 62. In the case of this pixel configuration, the transfer transistor 612 is only required to be omitted in the light receiving unit 61. Furthermore, the column processing unit 15 of FIG. 3 can be configured not to include an analog-digital conversion function. By adopting a pixel configuration that does not output a pixel signal, scale of the event detection sensor 10 can be suppressed.

[Configuration Example of Event Detection Unit]

Figure 6:
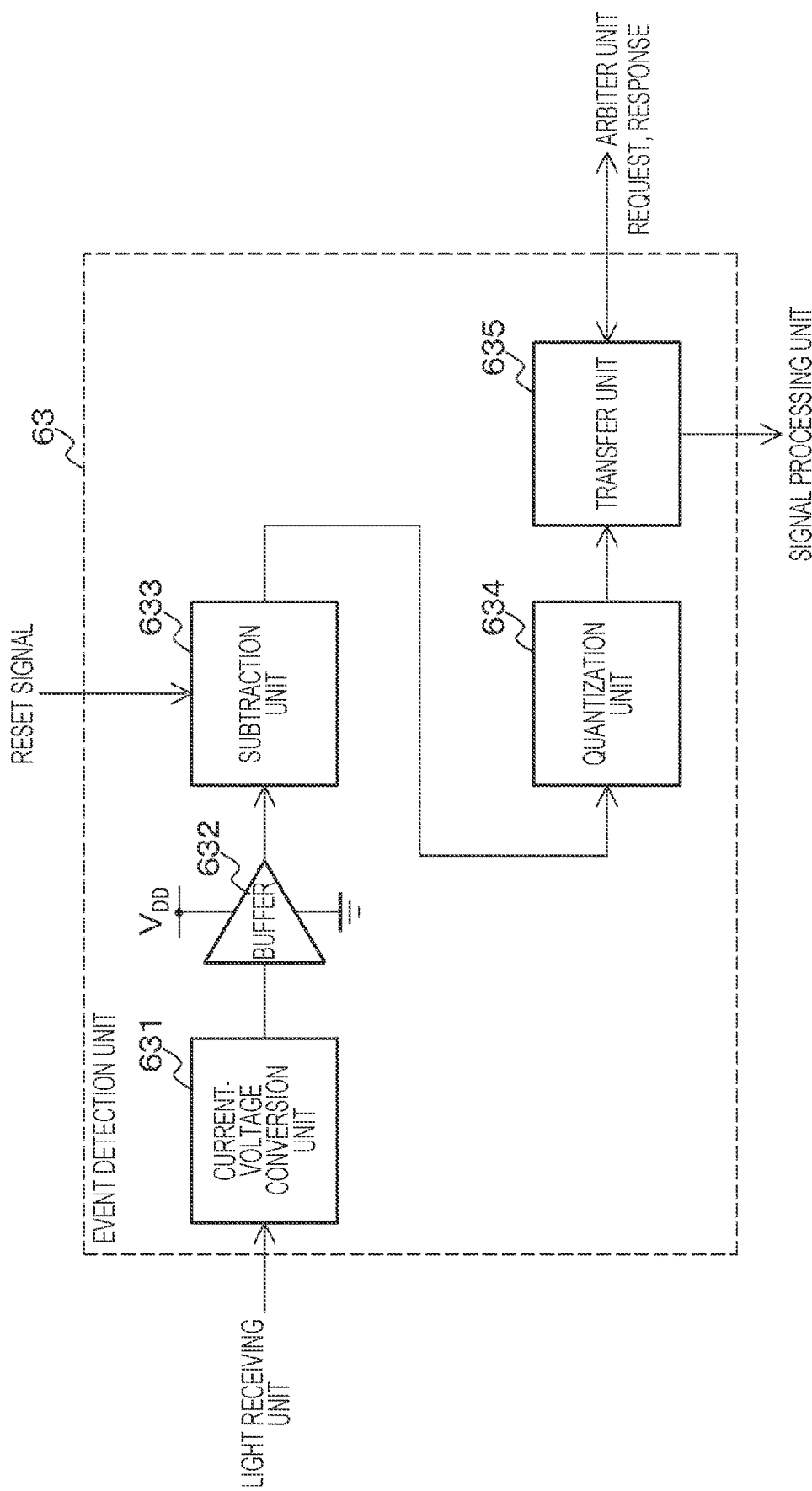
FIG. 6 is a block diagram illustrating an example of a circuit configuration of an event detection unit in the pixel of the event detection sensor.

FIG. 6 is a block diagram illustrating an example of a circuit configuration of the event detection unit 63 in the pixel 11 of the event detection sensor 10.

As illustrated in FIG. 6, the event detection unit 63 according to this example includes a current-voltage conversion unit 631, a buffer 632, a subtraction unit 633, a quantization unit 634, and a transfer unit 635.

The current-voltage conversion unit 631 converts the photocurrent supplied from the light receiving unit 61 of the pixel 11 into a voltage signal (hereinafter, may be referred to as "photovoltage") that is a logarithm of the photocurrent, and supplies the voltage signal to the buffer 632. The buffer 632 buffers the photovoltage supplied from the current-voltage conversion unit 631 and supplies the photovoltage to the subtraction unit 633.

The subtraction unit 633 calculates a difference between a current photovoltage, and a photovoltage at a time that differs from the present by a minute time, and supplies a difference signal corresponding to the difference to the quantization unit 634. The quantization unit 634 quantizes the difference signal supplied from the subtraction unit 633 into a digital signal, and supplies a digital value of the difference signal to the transfer unit 635.

When the digital value of the difference signal is supplied from the quantization unit 634, the transfer unit 635 supplies, to the arbiter unit 14, a request for transmitting event data. Then, when receiving a response to the request, that is, a response to permit output of the event data from the arbiter unit 14, the transfer unit 635 supplies the event data to the drive unit 13 and the signal processing unit 16 depending on the digital value of the difference signal supplied from the quantization unit 634.

Subsequently, a configuration example will be described of the current-voltage conversion unit 631, the subtraction unit 633, and the quantization unit 634 in the event detection unit 63.

(Configuration Example of Current-Voltage Conversion Unit)

Figure 7:
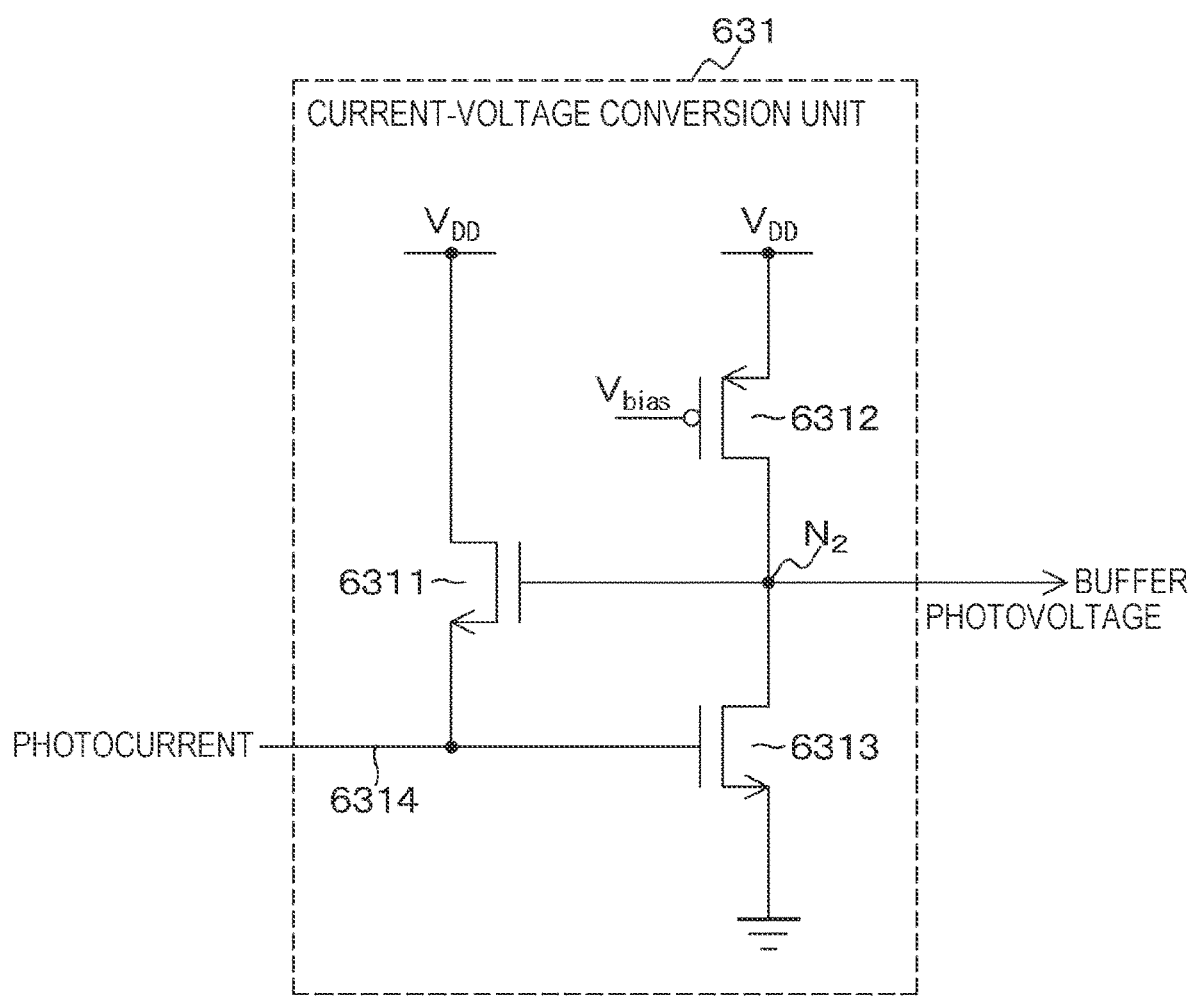
FIG. 7 is a circuit diagram illustrating an example of a configuration of a current-voltage conversion unit in the event detection unit.

FIG. 7 is a circuit diagram illustrating an example of a configuration of the current-voltage conversion unit 631 in the event detection unit 63.

As illustrated in FIG. 7, the current-voltage conversion unit 631 according to this example has a circuit configuration including a transistor 6311, a transistor 6312, and a transistor 6313. As the transistor 6311 and the transistor 6313, an N-type MOS transistor can be used, and as the transistor 6312, a P-type MOS transistor can be used.

The transistor 6311 is connected between the power supply line of the power supply voltage $V_{DD}$ and a signal input line 6314. The transistor 6312 and the transistor 6313 are connected in series between the power supply line of the power supply voltage $V_{DD}$ and the ground. Then, the gate electrode of the transistor 6311 and an input terminal of the buffer 632 illustrated in FIG. 6 are connected to a common connection node $N_2$ of the transistor 6312 and the transistor 6313.

A predetermined bias voltage $V_{bias}$ is applied to the gate electrode of the transistor 6312. As a result, the transistor 6312 supplies a constant current to the transistor 6313. The photocurrent is input from the light receiving unit 61 to the gate electrode of the transistor 6313 through the signal input line 6314.

The drain electrode of the transistor 6311 is connected to the power supply line of the power supply voltage $V_{DD}$, and has a source follower configuration. The gate electrode of the transistor 6313 is connected to the source electrode of the transistor 6311. Then, the photocurrent from the light receiving unit 61 is converted into a photovoltage corresponding to the logarithm of the photocurrent by the transistor 6311 and the transistor 6313 having the source follower configuration.

(Configuration Example of Subtraction Unit and Quantization Unit)

Figure 8:
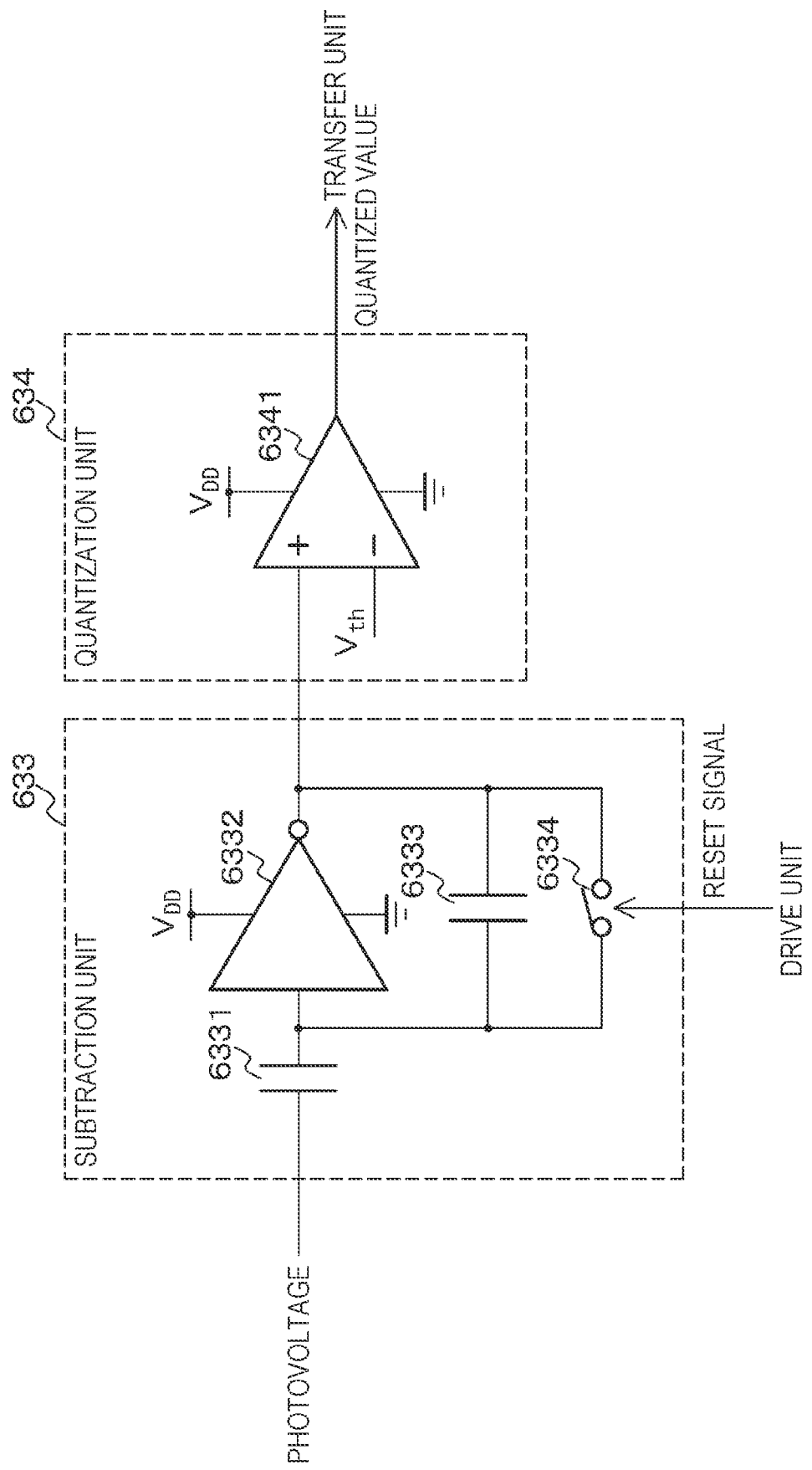
FIG. 8 is a circuit diagram illustrating an example of a configuration of a subtraction unit and a quantization unit in the event detection unit.

FIG. 8 is a circuit diagram illustrating an example of a configuration of the subtraction unit 633 and the quantization unit 634 in the event detection unit 63.

The subtraction unit 633 according to this example includes a capacitance element 6331, an operational amplifier 6332, a capacitance element 6333, and a switch element 6334.

One end of the capacitance element 6331 is connected to an output terminal of the buffer 632 illustrated in FIG. 6, and the other end of the capacitance element 6331 is connected to an input terminal of the operational amplifier 6332. As a result, the photovoltage supplied from the buffer 632 is input to the input terminal of the operational amplifier 6332 via the capacitance element 6331.

The capacitance element 6333 is connected in parallel to the operational amplifier 6332. The switch element 6334 is connected between both ends of the capacitance element 6333. The reset signal is supplied to the switch element 6334 from the arbiter unit 14 illustrated in FIG. 3 as a control signal for opening and closing the switch element 6334. The switch element 6334 opens and closes a path connecting both ends of the capacitance element 6333 in response to the reset signal.

In the subtraction unit 633 having the configuration described above, when the switch element 6334 is turned on (closed), the photovoltage input to a terminal on the buffer 632 side of the capacitance element 6331 is $V_{init}$. When a photovoltage $V_{init}$ is input to the terminal on the buffer 632 side of the capacitance element 6331, the terminal on the opposite side is a virtual ground terminal. A potential of this virtual ground terminal is set to zero for convenience. At this time, when a capacitance value of the capacitance element 6331 is $C_1$, electric charge $Q_{init}$ accumulated in the capacitance element 6331 is expressed by the following equation (1).

$$Q_{init} = C_1 \times V_{init} \qquad (1)$$

Furthermore, in a case where the switch element 6334 is turned on, both ends of the capacitance element 6333 are short-circuited, so that the electric charge accumulated in the capacitance element 6333 is zero. Thereafter, the switch element 6334 is turned off (open). In a case where the switch element 6334 is turned off, the photovoltage of the terminal on the buffer 632 side of the capacitance element 6331 is expressed as $V_{after}$. The electric charge $Q_{after}$ accumulated in the capacitance element 6331 in a case where the switch element 6334 is turned off is expressed by the following equation (2).

$$Q_{after} = C_1 \times V_{after} \qquad (2)$$

When a capacitance value of the capacitance element 6333 is expressed as $C_2$ and an output voltage of the operational amplifier 6332 is expressed as $V_{out}$, the electric charge $Q_2$ accumulated in the capacitance element 6333 is expressed by the following equation (3).

$$Q_2 = -C_2 \times V_{out} \qquad (3)$$

Before and after the switch element 6334 is turned off, a total amount of electric charge including an amount of electric charge of the capacitance element 6331 and an amount of electric charge of the capacitance element 6333 does not change, so that the following equation (4) holds.

$$Q_{init} = Q_{after} + Q_2 \qquad (4)$$

When the equations (1) to (3) are assigned to the equation (4), the following equation (5) is obtained.

$$V_{out} = -(C_1/C_2) \times (V_{after} - V_{init}) \qquad (5)$$

According to the equation (5), in the subtraction unit 633, subtraction is performed between the photovoltage $V_{init}$ and a photovoltage $V_{after}$, that is, calculation is performed of a difference signal $V_{out}$ corresponding to a difference ($V_{init} - V_{after}$) between the photovoltage $V_{init}$ and the photovoltage $V_{after}$. Furthermore, according to the equation (5), a subtraction gain of the subtraction unit 633 is $C_1/C_2$. Normally, it is desired to maximize the subtraction gain of the subtraction unit 633, so that it is preferable to design a capacitance value $C_1$ of the capacitance element 6331 to be large and a capacitance value $C_2$ of the capacitance element 6333 to be small.

On the other hand, if the capacitance value $C_2$ of the capacitance element 6333 is too small, kTC noise may increase and the noise characteristics may degrade, so that capacitance reduction of the capacitance value $C_2$ of the capacitance element 6333 is limited to a range in which noise can be tolerated. Furthermore, since the event detection unit 63 including the subtraction unit 633 is mounted on each pixel 11, the capacitance element 6331 and the capacitance element 6333 have restrictions on the area. In consideration of these, the capacitance value $C_1$ of the capacitance element 6331 and the capacitance value $C_2$ of the capacitance element 6333 are determined.

In FIG. 8, the quantization unit 634 includes a comparator 6341. In the comparator 6341, the difference signal from the subtraction unit 430 (that is, an output signal of the operational amplifier 6332) is a non-inverting (+) input, and a predetermined threshold voltage $V_t h$ is an inverting (−) input. Then, the comparator 6341 compares the difference signal $V_{out}$ from the subtraction unit 430 with the predetermined threshold voltage $V_t h$, and outputs a high level or a low level representing a comparison result as a quantized value of the difference signal $V_{out}$ to the transfer unit 635 illustrated in FIG. 6.

In a case where it is recognized from the quantized value of the difference signal $V_{out}$ from the quantization unit 634 that a change in the amount of light (change in brightness) as an event has occurred, that is, in a case where the difference signal $V_{out}$ is larger (or smaller) than the predetermined threshold voltage $V_{th}$, the transfer unit 635 outputs, for example, high level event data indicating the occurrence of the event to the signal processing unit 16 of FIG. 3. That is, the threshold voltage $V_{th}$ is a threshold value for detecting an event on the basis of a change in the amount of light (change in brightness) of the pixel 11.

The signal processing unit 16 includes, in event data supplied from the transfer unit 635, the position information of the pixel 11 detecting an event represented by the event data, and the time information indicating the time when the event has occurred, and further, polarity information of the change in the amount of light as the event as necessary, and output the event data.

As a data format of the event data including the position information of the pixel 11 detecting an event, the time information indicating the time when the event has occurred, and the polarity information of the change in the amount of light as the event, a data format can be adopted that is referred to as Address Event Representation (AER), for example.

Note that, the pixel 11 can receive any light as incident light by providing an optical filter that transmits predetermined light, such as a color filter. For example, in a case where the pixel 11 receives visible light as incident light, the event data represents occurrence of a change in the pixel value in an image in which a visible subject appears. Furthermore, for example, in a case where the pixel 11 receives infrared rays, millimeter waves, or the like for distance measurement as incident light, the event data represents occurrence of a change in the distance to the subject. Moreover, for example, in a case where the pixel 11 receives infrared rays for measuring the temperature as incident light, the event data represents occurrence of a change in the temperature of the subject. In the present embodiment, the pixel 11 receives visible light as incident light.

[Configuration Example of Chip Structure]

Figure 9:
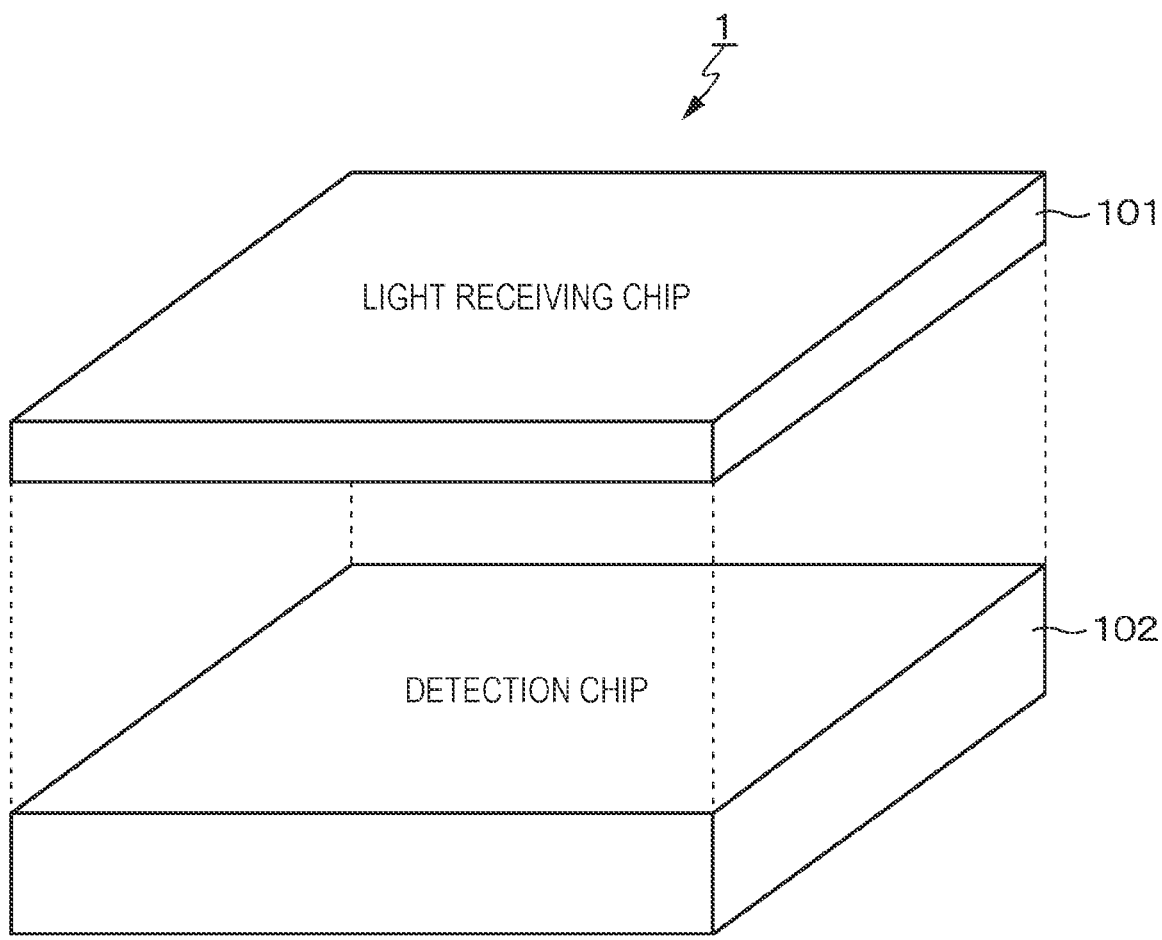
FIG. 9 is an exploded perspective view illustrating an outline of a laminated chip structure of the event detection sensor.

As a chip (semiconductor integrated circuit) structure of the event detection sensor 10 described above, for example, a laminated chip structure can be adopted. FIG. 9 is an exploded perspective view illustrating an outline of the laminated chip structure of the event detection sensor 10.

As illustrated in FIG. 9, the laminated chip structure, the so-called laminated structure, is a structure in which at least two chips of a light receiving chip 101 that is a first chip, and a detection chip 102 that is a second chip are laminated. Then, in the circuit configuration of the pixel 11 illustrated in FIG. 5, each of the light receiving elements 611 is arranged on the light receiving chip 101, and all the elements other than the light receiving elements 611, the elements of the other circuit portions of the pixel 11, and the like are arranged on the detection chip 102. The light receiving chip 101 and the detection chip 102 are electrically connected together via a connection portion such as a via (VIA), a Cu—Cu bonding, or a bump.

Note that, here, a configuration example has been exemplified in which the light receiving elements 611 are arranged on the light receiving chip 101 and elements other than the light receiving elements 611, elements of other circuit portions of the pixel 11, and the like are arranged on the detection chip 102; however, the present disclosure is not limited to this configuration example.

For example, in the circuit configuration of the pixel 11 illustrated in FIG. 5, each element of the light receiving unit 61 can be arranged on the light receiving chip 101, and elements other than the light receiving unit 61, elements of other circuit portions of the pixel 11, and the like can be arranged on the detection chip 102. Furthermore, each element of the light receiving unit 61, the reset transistor 621 of the pixel signal generation unit 62, and the floating diffusion layer 624 can be arranged on the light receiving chip 101, and elements other than those can be arranged on the detection chip 102. Moreover, some of the elements constituting the event detection unit 63 can be arranged on the light receiving chip 101 together with the elements of the light receiving unit 61, and the like.

<Configuration Example of Image Sensor>

A basic configuration will be described of the image sensor 20 in the imaging system 1 according to the present embodiment. Here, as the image sensor 20, a CMOS image sensor that is a kind of XY address type image sensor will be described as an example. The CMOS image sensor is an image sensor manufactured by applying or partially using a CMOS process. However, the image sensor 20 is not limited to the CMOS image sensor.

[Configuration Example of CMOS Image Sensor]

Figure 10:
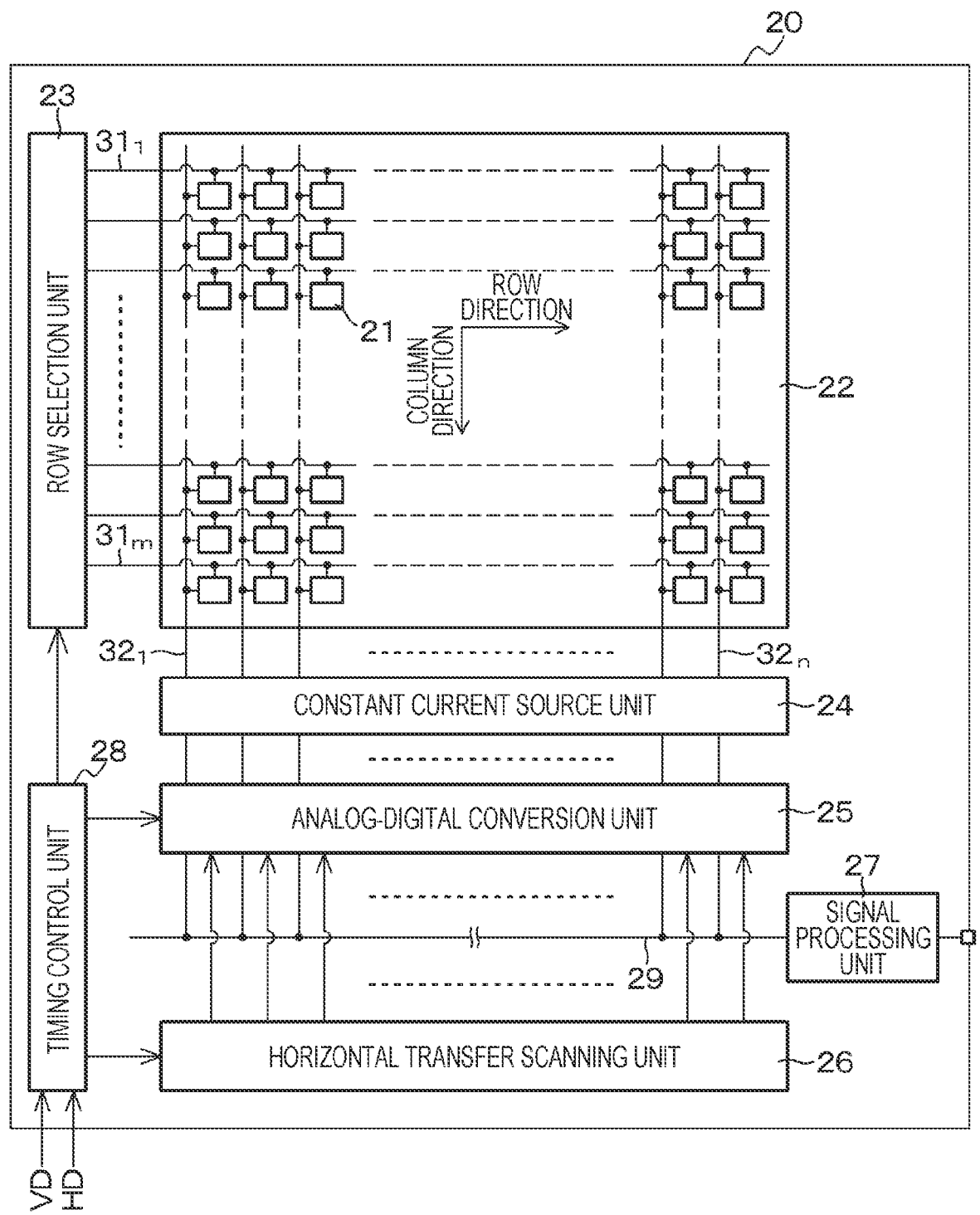
FIG. 10 is a block diagram illustrating an outline of a configuration of a CMOS image sensor that is an example of an image sensor in the imaging system.

FIG. 10 is a block diagram illustrating an outline of a configuration of a CMOS image sensor that is an example of the image sensor 20 in the imaging system 1 according to the present embodiment.

The image sensor 20 according to this example includes a pixel array unit 22 in which pixels 21 including a light receiving unit (photoelectric conversion unit) are arranged in the row direction and the column direction, that is, two-dimensionally arranged in a matrix, and a peripheral circuit unit of the pixel array unit 22. Here, the row direction refers to an arrangement direction of the pixels 21 in the pixel row, and the column direction refers to an arrangement direction of the pixels 21 in the pixel column. The pixels 21 generate and accumulate optical charge corresponding to an amount of received light by performing photoelectric conversion.

The image sensor 20 according to this example is an RGB sensor in which, for example, red (R), green (G), and blue (B) color filters are incorporated in each pixel 21 of the pixel array unit 22. However, the image sensor 20 is not limited to the RGB sensor.

The peripheral circuit unit of the pixel array unit 22 includes, for example, a row selection unit 23, a constant current source unit 24, an analog-digital conversion unit 25, a horizontal transfer scanning unit 26, a signal processing unit 27, a timing control unit 28, and the like.

In the pixel array unit 22, with respect to a matrix-like pixel array, pixel drive lines $31_1$ to $31_m$ (hereinafter, may be collectively referred to as "pixel drive line 31") are wired along the row direction for each pixel row. Furthermore, vertical signal lines $32_1$ to $32_n$ (hereinafter, may be collectively referred to as "vertical signal line 32") are wired along the column direction for each pixel column. The pixel drive line 31 transmits a drive signal for performing drive during reading of a signal from each of the pixels 21. In FIG. 1, the pixel drive line 31 is illustrated as one wiring line, but the wiring line is not limited to one wiring line. One end of the pixel drive line 31 is connected to an output end corresponding to each row of the row selection unit 23.

Hereinafter, description will be given of each circuit unit of the peripheral circuit unit of the pixel array unit 22, that is, the row selection unit 23, the constant current source unit 24, the analog-digital conversion unit 25, the horizontal transfer scanning unit 26, the signal processing unit 27, and the timing control unit 28.

The row selection unit 23 includes a shift register, an address decoder, and the like, and controls scanning of a pixel row and addressing of a pixel row when selecting each pixel 21 of the pixel array unit 22. Although the specific configuration of the row selection unit 23 is not illustrated, it generally includes two scanning systems, a read scanning system and a sweep scanning system.

The read scanning system sequentially performs selective scanning of the pixels 21 of the pixel array unit 22 on a row basis to read a pixel signal from the pixel 21. The pixel signal read from the pixel 21 is an analog signal. The sweep scanning system performs sweep scanning for a read row on which read scanning is performed by the read scanning system, prior to the read scanning by a shutter speed time.

By the sweep scanning by the sweep scanning system, unnecessary charge is swept from the light receiving unit (photoelectric conversion unit) of the pixel 21 of the read row, whereby the light receiving unit is reset. Then, a so-called electronic shutter operation is performed by sweeping (resetting) unnecessary charge with this sweep scanning system. Here, the electronic shutter operation refers to operation of discarding the optical charge of the light receiving unit and starting new exposure (starting accumulation of optical charge).

The constant current source unit 24 includes a plurality of current sources I (see FIG. 18) including, for example, MOS transistors connected to each of the vertical signal lines $32_1$ to $32_n$ for each pixel column, and supplies a bias current to each pixel 21 of the pixel row selectively scanned by the row selection unit 23 through each of the vertical signal lines $32_1$ to $32_n$.

The analog-digital conversion unit 25 includes a set of a plurality of analog-digital converters (for example, provided for each pixel column) provided corresponding to the pixel column of the pixel array unit 22. The analog-digital conversion unit 25 is a column-parallel type analog-digital conversion unit that converts an analog pixel signal output through each of the vertical signal lines $32_1$ to $32n$ for each pixel column into a digital signal.

As the analog-digital converter in the column-parallel analog-digital conversion unit 25, for example, a single slope type analog-digital converter can be used that is an example of a reference signal comparison type analog-digital converter. However, the analog-digital converter is not limited to the single slope type analog-digital converter, and a sequential comparison type analog-digital converter and a delta-sigma modulation type (A modulation type) analog-digital converter, or the like can be used.

For an example of the analog-digital converter in the column-parallel analog-digital conversion unit 25, the same applies to the analog-digital converter in the analog-digital conversion unit constituting the column processing unit 15 (see FIG. 3) of the event detection sensor 10 described above.

The horizontal transfer scanning unit 26 includes a shift register, an address decoder, and the like, and controls scanning of a pixel column and addressing of a pixel column when reading a signal of each pixel 21 of the pixel array unit 22. Under the control of the horizontal transfer scanning unit 26, the pixel signal converted into a digital signal by the analog-digital conversion unit 25 is read to a horizontal transfer line (horizontal output line) 29 on a pixel column basis.

The signal processing unit 27 performs predetermined signal processing on the digital pixel signal supplied through the horizontal transfer line 29 to generate two-dimensional image data. For example, the signal processing unit 27 corrects vertical line defects and point defects, clamps signals, or performs digital signal processing such as parallel-serial conversion, compression, coding, addition, averaging, and intermittent operation. The signal processing unit 27 outputs the generated image data as an output signal of the image sensor 20 to a subsequent device.

The timing control unit 28 generates various timing signals, clock signals, control signals, and the like, on the basis of a vertical synchronization signal VD, a horizontal synchronization signal HD, and further, a master clock MCK (not illustrated), and the like supplied from the outside. Then, the timing control unit 28 performs drive control of the row selection unit 23, the constant current source unit 24, the analog-digital conversion unit 25, the horizontal transfer scanning unit 26, the signal processing unit 27, and the like, on the basis of these generated signals.

Under the control of the timing control unit 28, the image sensor 20 performs imaging in synchronization with a synchronization signal such as the vertical synchronization signal VD. That is, the image sensor 20 is a synchronous imaging device that performs imaging at a predetermined frame rate, for example, a fixed frame rate.

[Circuit Configuration Example of Pixel]

Figure 11:
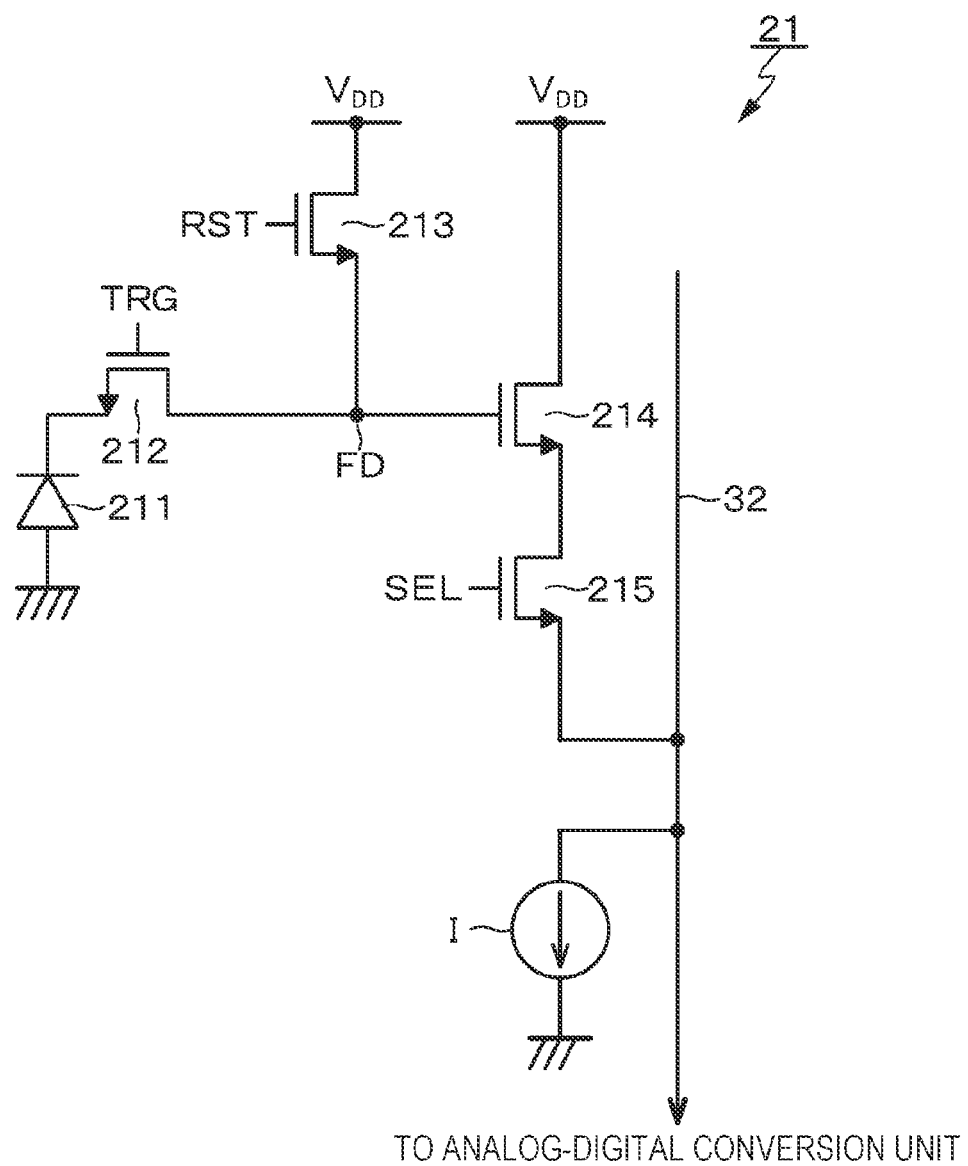
FIG. 11 is a circuit diagram illustrating an example of a circuit configuration of a pixel in the image sensor.

FIG. 11 is a circuit diagram illustrating an example of a circuit configuration of the pixel 21 of the pixel array unit 22 in the image sensor 20.

The pixel 21 includes, for example, a photodiode 211 as a light receiving unit (photoelectric conversion unit). The pixel 21 includes a transfer transistor 212, a reset transistor 213, an amplification transistor 214, and a selection transistor 215 in addition to the photodiode 211.

Note that, here, for example, N-type MOS transistors are used as the four transistors of the transfer transistor 212, the reset transistor 213, the amplification transistor 214, and the selection transistor 215, but a combination of conductivity types of the four transistors 212 to 215 exemplified here is only an example, and is not limited to the combination of these.

With respect to the pixel 21, as the pixel drive line 31 described above, a plurality of pixel drive lines is wired commonly to each pixel 21 in the same pixel row. The plurality of pixel drive lines is connected to an output end corresponding to each pixel row of the row selection unit 23 on a pixel row basis. The row selection unit 23 appropriately outputs the transfer signal TRG, the reset signal RST, and the selection signal SEL to the plurality of pixel drive lines.

In the photodiode 211, the anode electrode is connected to a low potential side power supply (for example, ground), and the received light is photoelectrically converted into optical charge (here, photoelectron) having an amount of charge corresponding to an amount of light, and the optical charge is accumulated. The cathode electrode of the photodiode 211 is electrically connected to the gate electrode of the amplification transistor 214 via the transfer transistor 212. Here, a region to which the gate electrode of the amplification transistor 214 is electrically connected is a floating diffusion (floating diffusion region/impurity diffusion region) FD. The floating diffusion FD is a charge-voltage conversion unit that converts electric charge into voltage.

The transfer signal TRG in which the high level (for example, a $V_{DD}$ level) is active is given to the gate electrode of the transfer transistor 212 from the row selection unit 23. When being turned on in response to the transfer signal TRG, the transfer transistor 212 transfers the optical charge photoelectrically converted by the photodiode 211 and accumulated in the photodiode 211 to the floating diffusion FD.

The reset transistor 213 is connected between the power supply line of the power supply voltage $V_{DD}$ and the floating diffusion FD. The reset signal RST in which the high level is active is given to the gate electrode of the reset transistor 213 from the row selection unit 23. The reset transistor 213 is turned on in response to the reset signal RST, and resets the floating diffusion FD by discarding the electric charge of the floating diffusion FD to the node of the power supply voltage $V_{DD}$.

In the amplification transistor 214, the gate electrode is connected to the floating diffusion FD, and the drain electrode is connected to the power supply line of the power supply voltage $V_{DD}$. The amplification transistor 214 serves as an input unit of a source follower that reads a signal obtained by photoelectric conversion in the photodiode 211. The source electrode of the amplification transistor 214 is connected to the vertical signal line 32 via the selection transistor 215. Then, the amplification transistor 214 and the current source I connected to one end of the vertical signal line 32 constitute a source follower that converts a voltage of the floating diffusion FD into a potential of the vertical signal line 32.

In the selection transistor 215, the drain electrode is connected to the source electrode of the amplification transistor 214, and the source electrode is connected to the vertical signal line 32. The selection signal SEL in which the high level is active is given to the gate electrode of the selection transistor 215 from the row selection unit 23. The selection transistor 215 is turned on in response to the selection signal SEL, thereby selecting the pixel 21 to transmit a signal output from the amplification transistor 214 to the vertical signal line 32.

Note that, here, as a pixel circuit of the pixel 21, a 4Tr configuration is taken as an example including the transfer transistor 212, the reset transistor 213, the amplification transistor 214, and the selection transistor 215, that is, including four transistors (Tr), but this is not a limitation. For example, a 3Tr configuration can be adopted in which the selection transistor 215 is omitted and the function of the selection transistor 25 is given to the amplification transistor 214, or a configuration of 5Tr or more in which the number of transistors is increased can be adopted, as necessary.

[Configuration Example of Chip Structure]

Examples of the chip (semiconductor integrated circuit) structure of the image sensor 20 having the configuration described above include a horizontally mounted chip structure and a laminated chip structure. In any of the image sensors 20 having the horizontally mounted chip structure and the laminated chip structure, when a substrate surface on a side where a wiring layer is arranged is a front surface of the pixel 21, a front-illuminated pixel structure can be adopted that captures light emitted from the front surface side, or a back-illuminated pixel structure can be adopted that captures light emitted from the back surface side that is the opposite side of the front surface. The horizontally mounted chip structure and the laminated chip structure will be described below.

(Horizontally Mounted Chip Structure)

Figure 12:
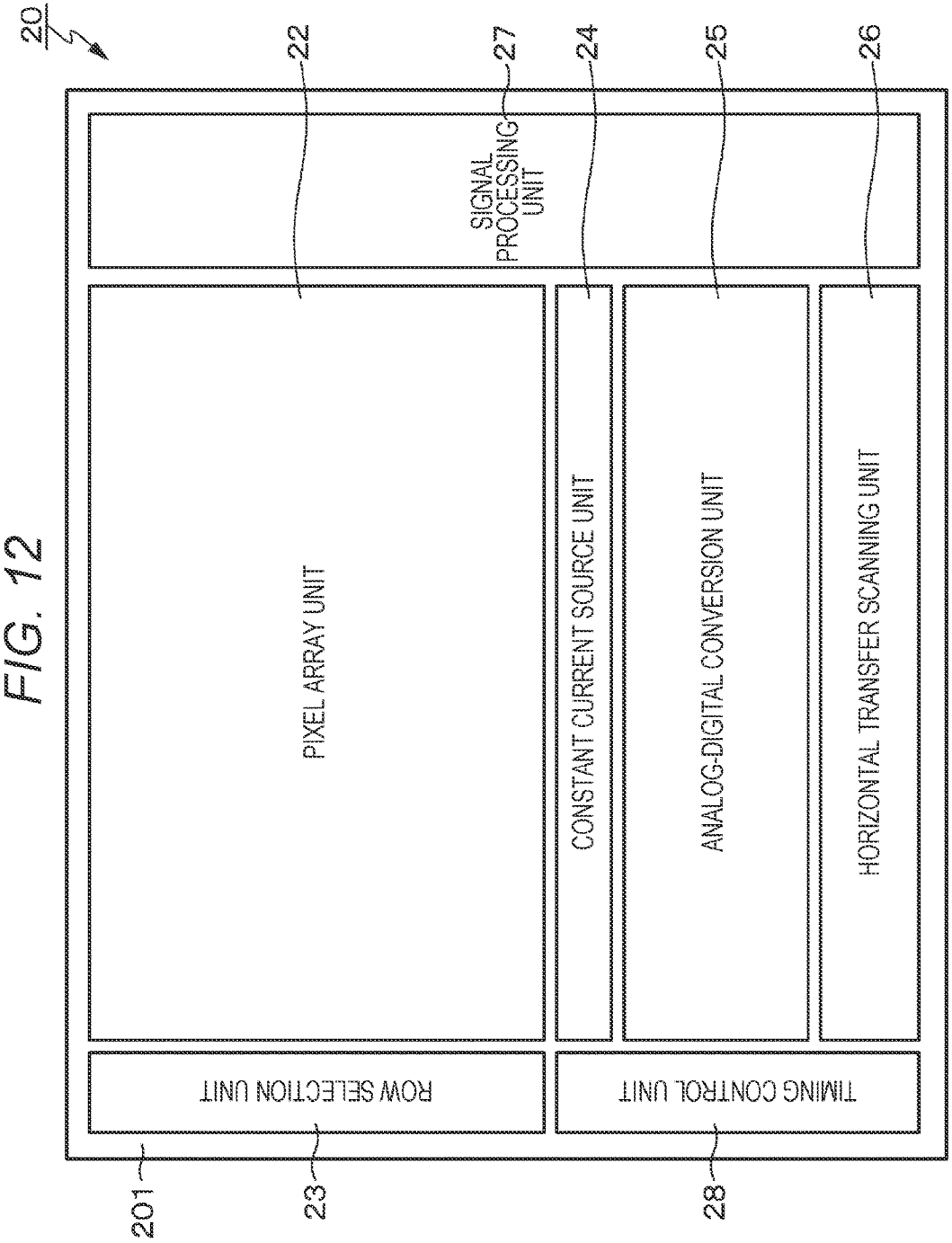
FIG. 12 is a plan view illustrating an outline of a horizontally mounted chip structure of the image sensor.

FIG. 12 is a plan view illustrating an outline of a horizontally mounted chip structure of the image sensor 20.

As illustrated in FIG. 12, the horizontally mounted chip structure (so-called horizontally mounted structure) has a structure in which circuit portions around the pixel array unit 22 is formed on a semiconductor substrate 201 that is the same as the pixel array unit 22 in which the pixels 21 are arranged in a matrix. Specifically, on the same semiconductor substrate 201 as the pixel array unit 22, the row selection unit 23, the constant current source unit 24, the analog-digital conversion unit 25, the horizontal transfer scanning unit 26, the signal processing unit 27, the timing control unit 28, and the like are formed.

(Laminated Chip Structure)

Figure 13:
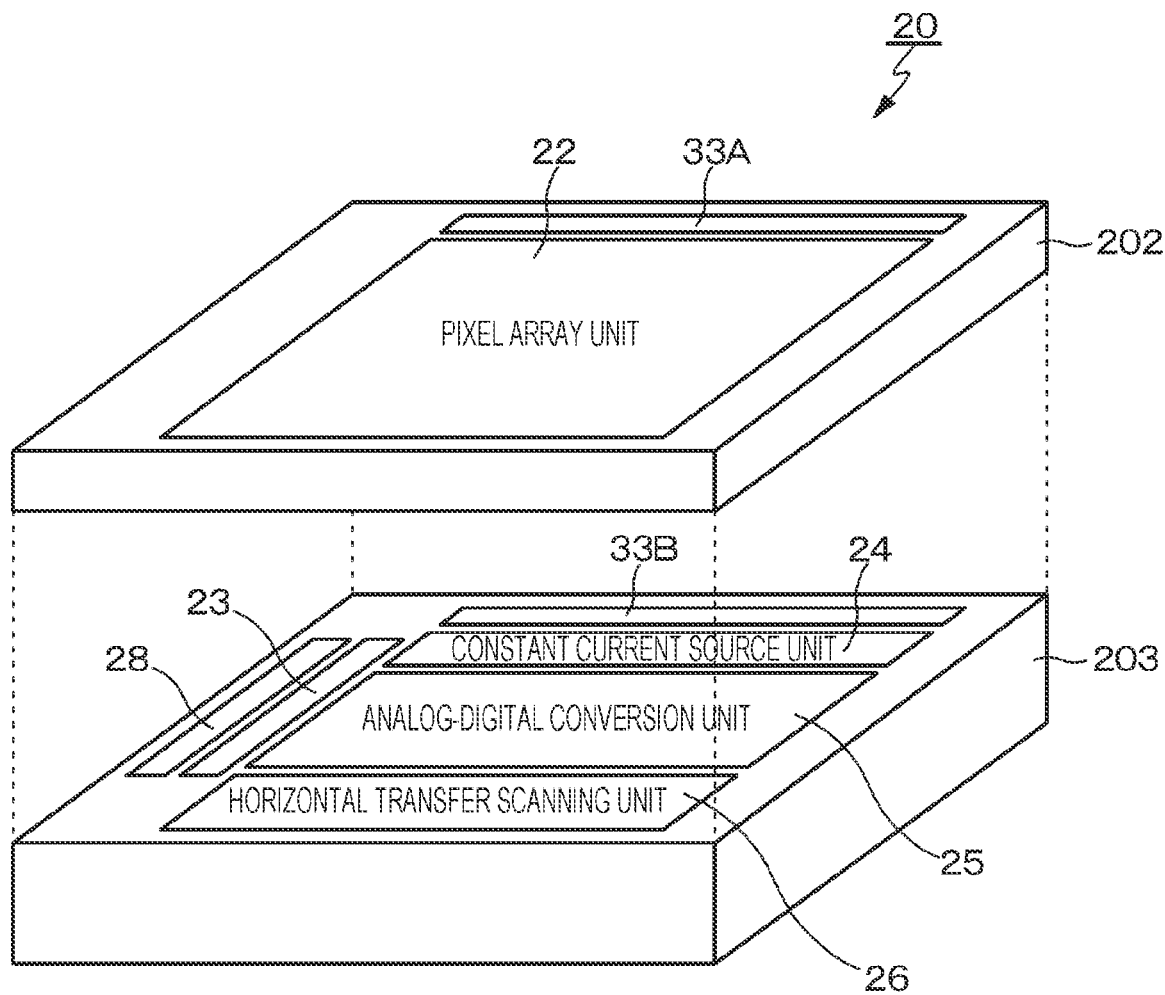
FIG. 13 is a plan view illustrating an outline of a laminated chip structure of the image sensor.

FIG. 13 is an exploded perspective view illustrating an outline of the laminated chip structure of the image sensor 20.

As illustrated in FIG. 13, the laminated chip structure (so-called laminated structure) has a structure in which at least two semiconductor substrates of a first semiconductor substrate 202 and a second semiconductor substrate 203 are laminated. In this laminated structure, the pixel array unit 22 is formed on the first semiconductor substrate 202 of the first layer. Furthermore, the circuit portions such as the row selection unit 23, the constant current source unit 24, the analog-digital conversion unit 25, the horizontal transfer scanning unit 26, the signal processing unit 27, and the timing control unit 28 are formed on the second semiconductor substrate 203 of the second layer. Then, the first semiconductor substrate 202 of the first layer and the second semiconductor substrate 203 of the second layer are electrically connected together through connection portions 33A and 33B such as VIA and Cu—Cu bonding.

According to the image sensor 20 having the laminated structure, a process suitable for manufacturing the pixels 21 can be applied to the first semiconductor substrate 202 of the first layer, and a process suitable for manufacturing the circuit portions can be applied to the second semiconductor substrate 203 of the second layer, so that the process can be optimized in manufacturing the image sensor 20. In particular, an advanced process can be applied to manufacturing the circuit portions.

Note that, here, a laminated structure having a two-layer structure in which the first semiconductor substrate 202 and the second semiconductor substrate 203 are laminated is exemplified, but the laminated structure is not limited to the two-layer structure, and can have three or more layers. Then, in the case of a laminated structure of three or more layers, the circuit portions such as the row selection unit 23, the constant current source unit 24, the analog-digital conversion unit 25, the horizontal transfer scanning unit 26, and the signal processing unit 27 can be dispersedly formed on the second and subsequent layers of the semiconductor substrate.

By the way, a dangerous state may be encountered in which another vehicle suddenly interrupts in front of a subject vehicle during traveling of the subject vehicle. At this time, it is desired to be able to predict that such a dangerous state occurs in advance from a viewpoint of preventing collision accidents and the like and maintaining safe vehicle running. Thus, in the present embodiment, in the imaging system 1 having the configuration described above, to prevent a collision accident and the like and maintain safe vehicle driving, it is enabled to predict in advance that a dangerous state occurs that hinders safe driving.

According to the present embodiment, since it is possible to predict in advance that a dangerous state occurs that hinders safe driving, it is possible to prevent collision accidents and the like and contribute to maintenance of safe vehicle driving. Hereinafter, a specific example will be described of the present embodiment for predicting a dangerous state that hinders safe driving in the imaging system 1 having the configuration described above.

In each example of the present embodiment described below, the prediction (estimation) of the dangerous state is executed in the motion vector estimation unit 50 under the control of the control unit 60.

Example 1

Figure 14:
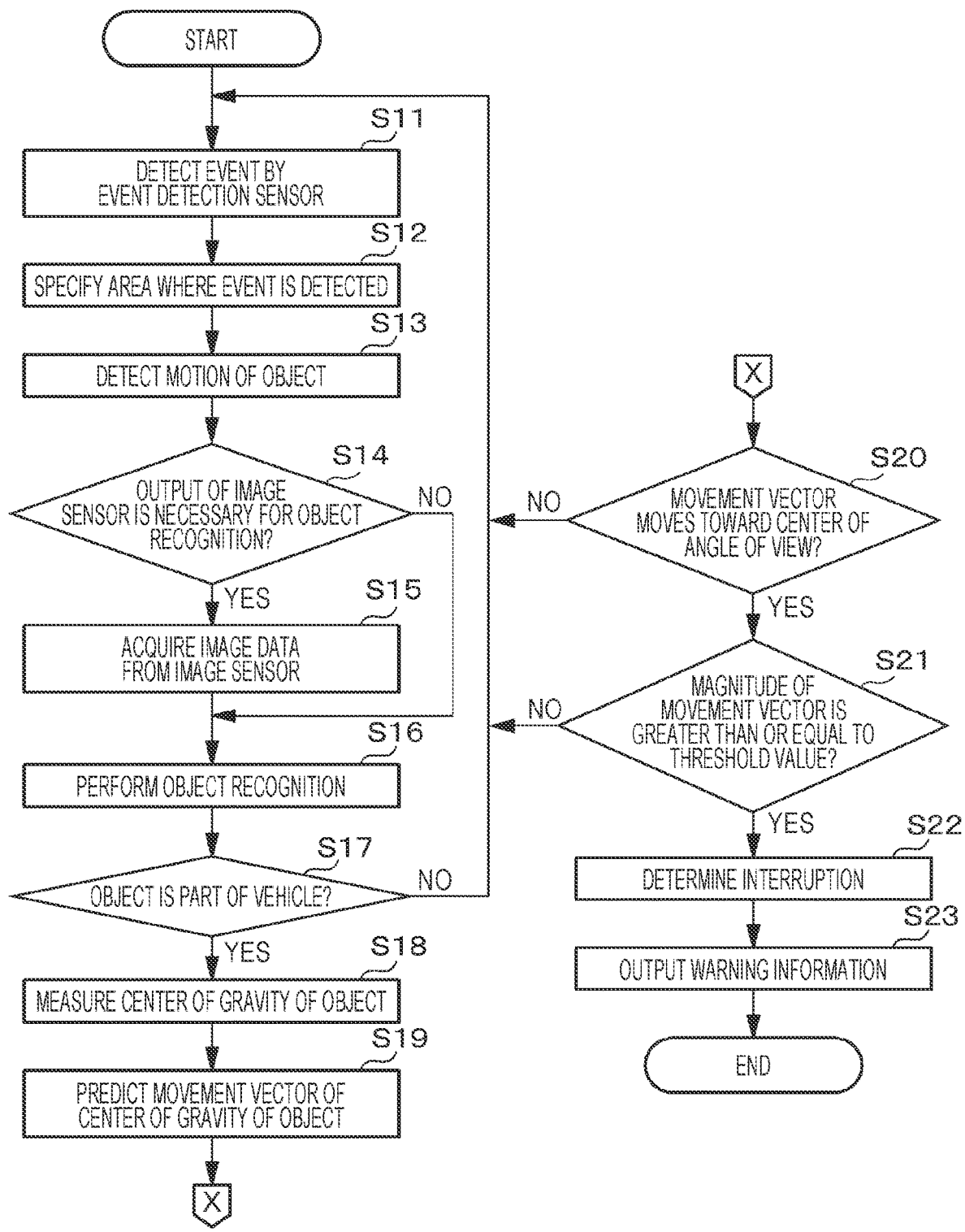
FIG. 14 is a flowchart illustrating a flow of risk prediction according to Example 1.

Example 1 is an example of detecting the vehicle interruption on the basis of the movement vector of the center of gravity of the object. A flow of risk prediction according to Example 1 is illustrated in a flowchart of FIG. 14.

The control unit 60 first performs event detection by the event detection sensor 10 (step S11), and then specifies an area where the event is detected in the event detection sensor 10 (step S12), and then the motion recognition unit 30 performs motion detection of an object detected as an event (step S13).

Next, the control unit 60 determines whether or not it is necessary to perform object recognition using the image data output from the image sensor 20 (step S14). Here, in a case where it is determined that it is necessary to perform object recognition using the image data of the image sensor 20, it means that it is not possible to perform object recognition using only the event signal (event data) output from the event detection sensor 10.

In the case of this determination, the control unit 60 acquires the image data output in the frame format from the image sensor 20 (step S15), and then the object recognition unit 40 performs recognition processing of the object detected as an event using the image data in the frame format (step S16). In a case where it is determined in the process of step S14 that it is not necessary to perform object recognition using the image data of the image sensor 20, the control unit 60 proceeds to step S16, and performs object recognition using only the event signal (event data) output from the event detection sensor 10.

Next, the control unit 60 determines whether or not the object detected as an event is a part of the vehicle on the basis of the result of the object recognition, for example, by using a well-known pattern matching technology (step S17), and if it is not a part of the vehicle, returns to step S11 and repeats the above-described process, and if it is a part of the vehicle, measures the center of gravity of the object (step S18).

Subsequently, the control unit 60 predicts the movement vector of the center of gravity of the object (step S19), and then determines whether or not the movement vector of the center of gravity of the object moves toward the center of the angle of view (imageable range) of the event detection sensor 10 (step S20). Here, the fact that the movement vector of the center of gravity of the object is toward the center of the angle of view means that another vehicle is traveling toward the subject vehicle. If the movement vector of the center of gravity of the object is not toward the center of the angle of view, the process returns to step S11 and the above-described process is repeated.

In a case where the control unit 60 determines that the movement vector of the center of gravity of the object is toward the center of the angle of view, the control unit 60 determines whether or not the magnitude of the movement vector is greater than or equal to a predetermined threshold value (step S21). Here, when the magnitude of the movement vector is greater than or equal to the threshold value, it can be said that the vehicle speed of the other vehicle heading for the subject vehicle is high. If the magnitude of the movement vector is less than the threshold value, the process returns to step S11 and the above-described process is repeated.

In a case where the movement vector of the center of gravity of the object is toward the center of the angle of view and the magnitude of the movement vector is greater than or equal to the threshold value, the control unit 60 determines that another vehicle has interrupted in front of the subject vehicle (step S22), outputs warning information for warning that a dangerous state has occurred (step S23), and ends a series of processes for interruption detection described above is completed.

The warning information output from the control unit 60 is supplied to the vehicle control system 7000 (see FIG. 18) via the interface 90. In the vehicle control system 7000, when the warning information notification is received from the control unit 60, as an example, control is performed such as an alert display on a display or the like, an alarm by sound, brake control, or the like to notify the driver that a dangerous state has occurred.

Example 2

Figure 15:
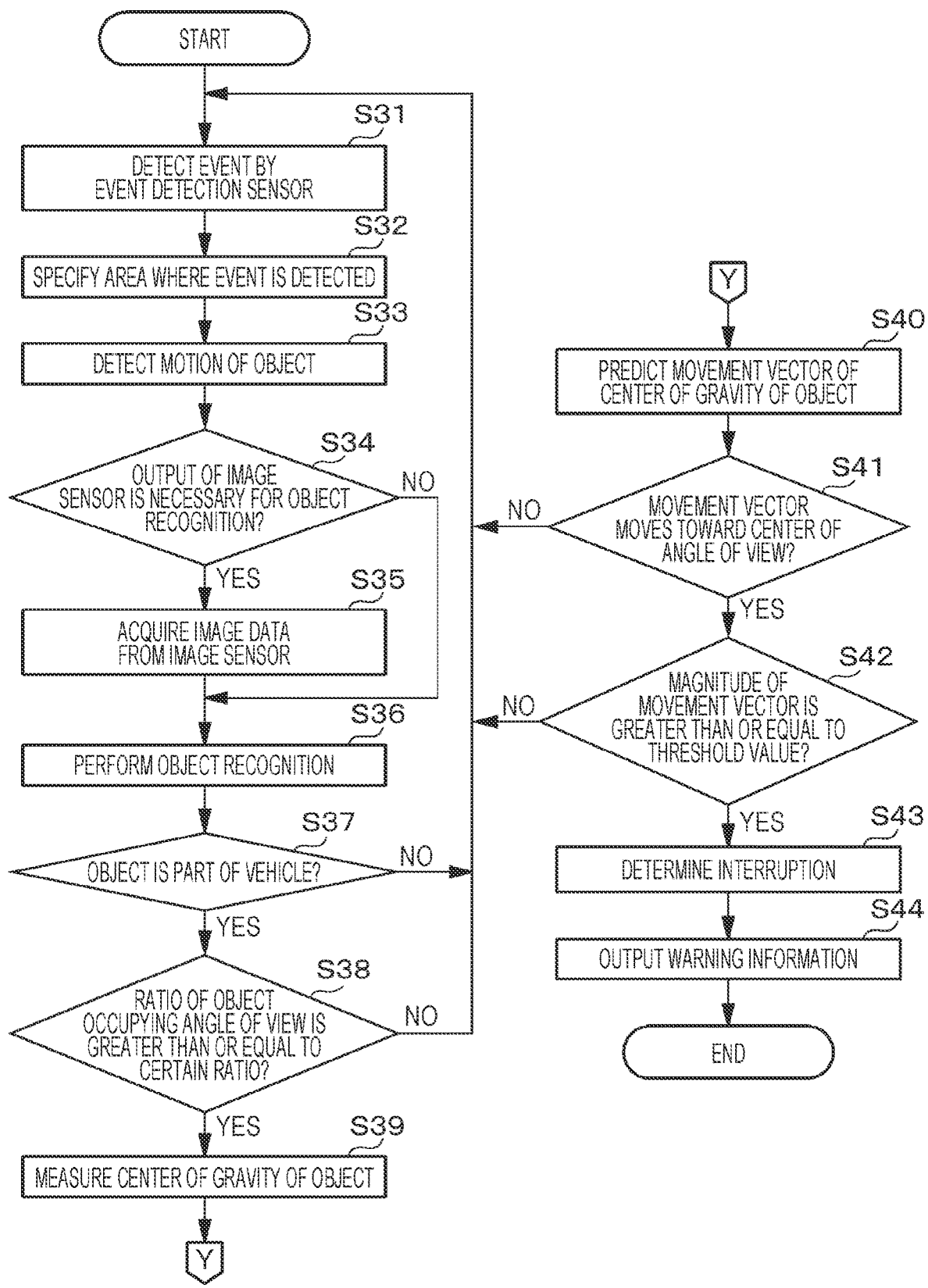
FIG. 15 is a flowchart illustrating a flow of risk prediction according to Example 2.

Example 2 is an example of detecting interruption on the basis of the ratio of the object occupying the angle of view and the movement vector of the center of gravity of the object. A flow of risk prediction according to Example 2 is illustrated in a flowchart of FIG. 15.

The control unit 60 first performs event detection by the event detection sensor 10 (step S31), and then specifies an area where the event is detected in the event detection sensor 10 (step S32), and then the motion recognition unit 30 performs motion detection of an object detected as an event (step S33).

Next, the control unit 60 determines whether or not it is necessary to perform object recognition using the image data output from the image sensor 20 (step S34). Then, in a case where it is determined that it is necessary to perform object recognition using the image data of the image sensor 20, the control unit 60 acquires the image data from the image sensor 20 (step S35), and then the object recognition unit 40 performs recognition processing of the object detected as an event (step S36).

In a case where it is determined in the process of step S34 that it is not necessary to perform object recognition using the image data of the image sensor 20, the control unit 60 proceeds to step S36, and performs object recognition using only the event signal (event data) output from the event detection sensor 10.

Next, the control unit 60 determines whether or not the object detected as an event is a part of the vehicle on the basis of the result of the object recognition (step S37), and if it is not a part of the vehicle, returns to step S31 and repeats the above-described process, and if it is a part of the vehicle, determines whether or not the ratio of the object occupying the angle of view is greater than or equal to a certain ratio (step S38).

If the ratio of the object occupying the angle of view is less than the certain ratio, the control unit 60 returns to step S31 and repeats the above-described process, and if the ratio is greater than or equal to the certain ratio, the control unit 60 measures the center of gravity of the object (step S39), and then predicts the movement vector of the center of gravity of the object (step S40), and then determines whether or not the movement vector of the center of gravity of the object is toward the center of the angle of view (step S41).

In a case where it is determined that the movement vector of the center of gravity of the object is toward the center of the angle of view, the control unit 60 determines whether or not the magnitude of the movement vector is greater than or equal to a predetermined threshold value (step S42) and if the magnitude of the movement vector is less than the threshold value, returns to step S31 and repeats the above-described process.

In a case where the movement vector of the center of gravity of the object is toward the center of the angle of view and the magnitude of the movement vector is greater than or equal to the threshold value, the control unit 60 determines that another vehicle has interrupted in front of the subject vehicle (step S43), outputs warning information for warning that a dangerous state has occurred (step S44), and ends a series of processes for interruption detection described above is completed. The control by the vehicle control system 7000 based on the warning information is as described in Example 1.

Example 3

Figure 16:
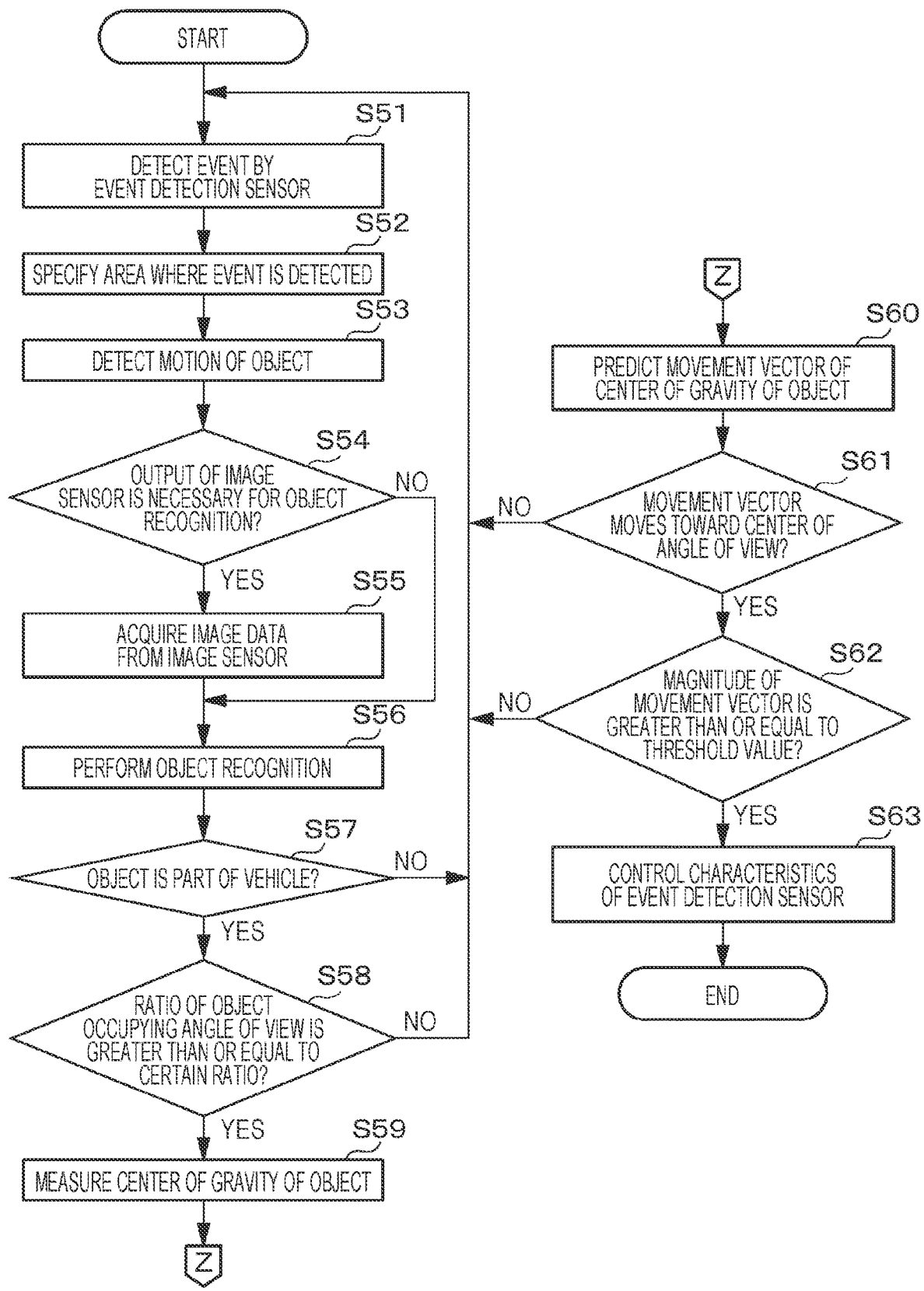
FIG. 16 is a flowchart illustrating a flow of risk prediction according to Example 3.

Example 3 is an example of controlling the characteristics of the event detection sensor 10 in a case where a situation corresponding to interruption occurs. A flow of risk prediction according to Example 2 is illustrated in a flowchart of FIG. 16.

Here, the case where a situation corresponding to interruption occurs means a case where a situation of determining interruption in Example 1 and Example 2.

Furthermore, as the characteristics of the event detection sensor 10, the resolution of the event detection sensor 10 or a detection sensitivity of event detection can be exemplified.

The control unit 60 first performs event detection by the event detection sensor 10 (step S51), and then specifies an area where the event is detected in the event detection sensor 10 (step S52), and then the motion recognition unit 30 performs motion detection of an object detected as an event (step S53).

Next, the control unit 60 determines whether or not it is necessary to perform object recognition using the image data output from the image sensor 20 (step S54). Then, in a case where it is determined that it is necessary to perform object recognition using the image data of the image sensor 20, the control unit 60 acquires the image data from the image sensor 20 (step S55), and then the object recognition unit 40 performs recognition processing of the object detected as an event (step S56).

In a case where it is determined in the process of step S34 that it is not necessary to perform object recognition using the image data of the image sensor 20, the control unit 60 proceeds to step S56, and performs object recognition using only the event signal (event data) output from the event detection sensor 10.

Next, the control unit 60 determines whether or not the object detected as an event is a part of the vehicle on the basis of the result of the object recognition (step S57), and if it is not a part of the vehicle, returns to step S51 and repeats the above-described process, and if it is a part of the vehicle, determines whether or not the ratio of the object occupying the angle of view is greater than or equal to a certain ratio (step S58).

If the ratio of the object occupying the angle of view is less than the certain ratio, the control unit 60 returns to step S51 and repeats the above-described process, and if the ratio is greater than or equal to the certain ratio, the control unit 60 measures the center of gravity of the object (step S59), and then predicts the movement vector of the center of gravity of the object (step S60), and then determines whether or not the movement vector of the center of gravity of the object is toward the center of the angle of view (step S61).

In a case where it is determined that the movement vector of the center of gravity of the object is toward the center of the angle of view, the control unit 60 determines whether or not the magnitude of the movement vector is greater than or equal to a predetermined threshold value (step S62) and if the magnitude of the movement vector is less than the threshold value, returns to step S51 and repeats the above-described process.

In a case where the movement vector of the center of gravity of the object is toward the center of the angle of view and the magnitude of the movement vector is greater than or equal to the threshold value, the control unit 60 determines to be in a dangerous situation such as another vehicle's interruption, and controls the characteristics of the event detection sensor 10, specifically, the resolution of the event detection sensor 10 or the detection sensitivity of the event detection (gain of the event detection sensor 10) (step S63), and ends the series of processes for controlling the characteristics of the above-described event detection sensor 10.

The resolution of the event detection sensor 10 can be controlled by applying well-known technologies for pixel thinning out reading and pixel addition reading. Event detection can be performed with high accuracy by setting a high resolution with a relatively high resolution, and power consumption can be reduced by setting a low resolution with a relatively low resolution. As an example, an area recognized as a vehicle (pixel area) can be set to a high resolution, and an area other than the area recognized as the vehicle can be set to a low resolution.

Furthermore, the detection sensitivity of event detection can be controlled by controlling the detection threshold value of the event detection unit 63 illustrated in FIG. 4. More specifically, regarding the detection sensitivity of event detection, it can be controlled by changing the circuit configuration of the current-voltage conversion unit 631 illustrated in FIG. 7, the capacitance ratio of the subtraction unit 633 illustrated in FIG. 8, or the threshold voltage $V_{th}$ of the quantization unit 634.

<<Modifications>>

The technology according to the present disclosure has been described above on the basis of the preferred embodiments, but the technology according to the present disclosure is not limited to the embodiments. The configurations and structures of the imaging system described in the embodiments described above are examples and can be changed. For example, in the embodiments described above, the pixel signal generation unit 62 is provided for each light receiving unit 61 to form the pixel 11; however, a configuration can be adopted in which a block is made with a plurality of the light receiving units 61 as a unit, the pixel signal generation unit 62 is provided in each pixel block, and the pixel signal generation unit 62 is shared by the plurality of light receiving units 61 in the pixel block.

Furthermore, in the embodiment described above, the movement vector of the object is calculated as the movement vector of the center of gravity of the object, but the present invention is not limited to this, and the average of the movement vectors in the area recognized as the object may be calculated as the movement vector of the object.

Furthermore, in the embodiment described above, the imaging system including both the event detection sensor 10 and the image sensor 20 has been described, but in a case where recognition processing can be performed of the object detected as an event using only the event signal (event data) output by the event detection sensor 10, it is not always necessary to include the image sensor 20.

Figure 17:
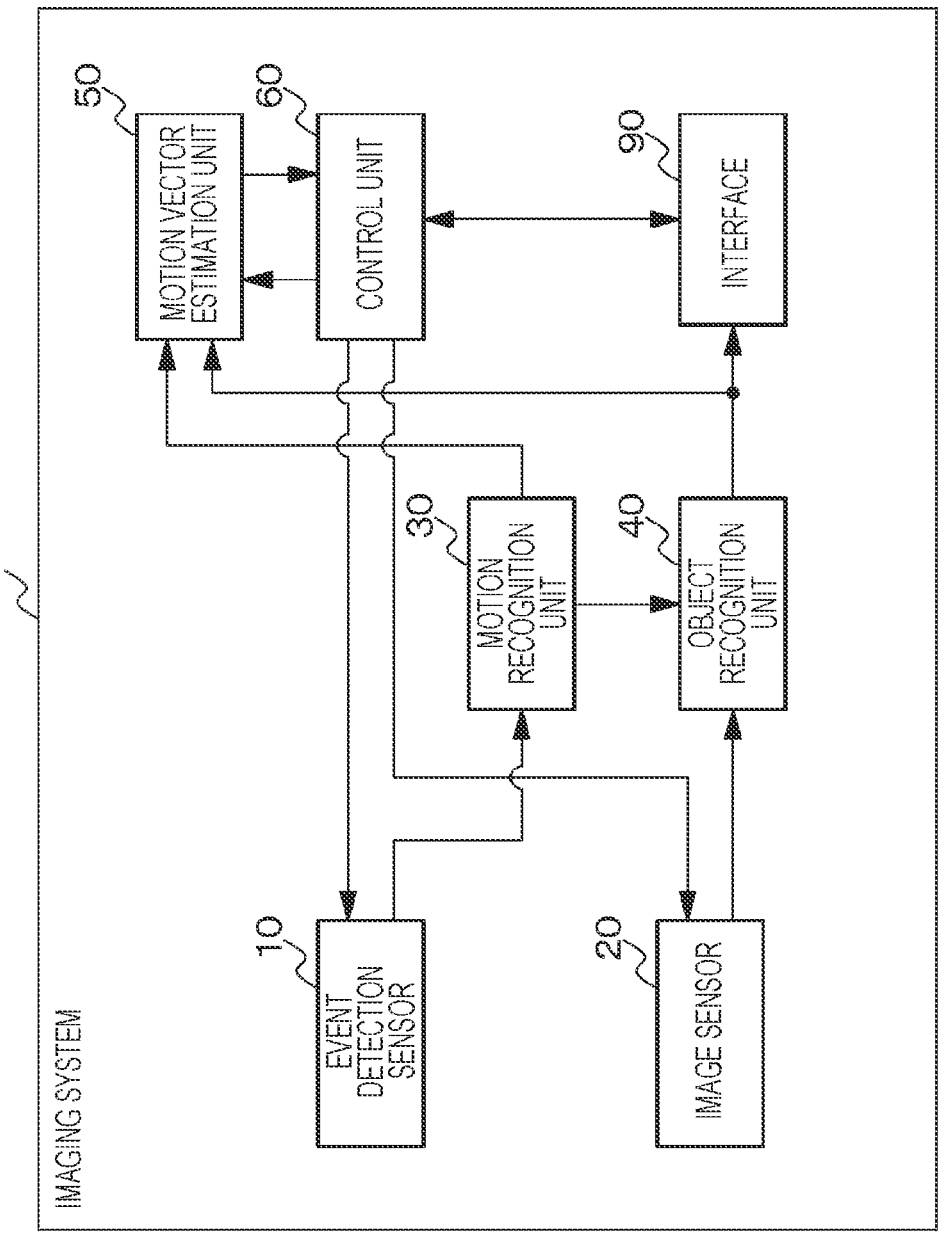
FIG. 17 is a block diagram illustrating a system configuration of an imaging system according to a modification of the embodiment of the present disclosure.

Furthermore, as a modification according to the embodiment of the present disclosure, a configuration illustrated in FIG. 17 can be used. That is, it is possible to configure the imaging system in which the vehicle control system 7000 has some functions in the imaging system 1 illustrated in FIG. 1, for example, the functions of the operation pattern definition unit 70 and the recording unit 80.

<<Application Example of Technology According to Present Disclosure>>

The technology according to the present disclosure can be applied to various products. A more specific application example will be described below. The technology according to the present disclosure may be implemented as an imaging system mounted on any type of mobile body, for example, a car, an electric car, a hybrid electric car, a motorcycle, a bicycle, a personal mobility, an airplane, a drone, a ship, a robot, a construction machine, an agricultural machine (tractor), and the like.

<Mobile Body>

Figure 18:
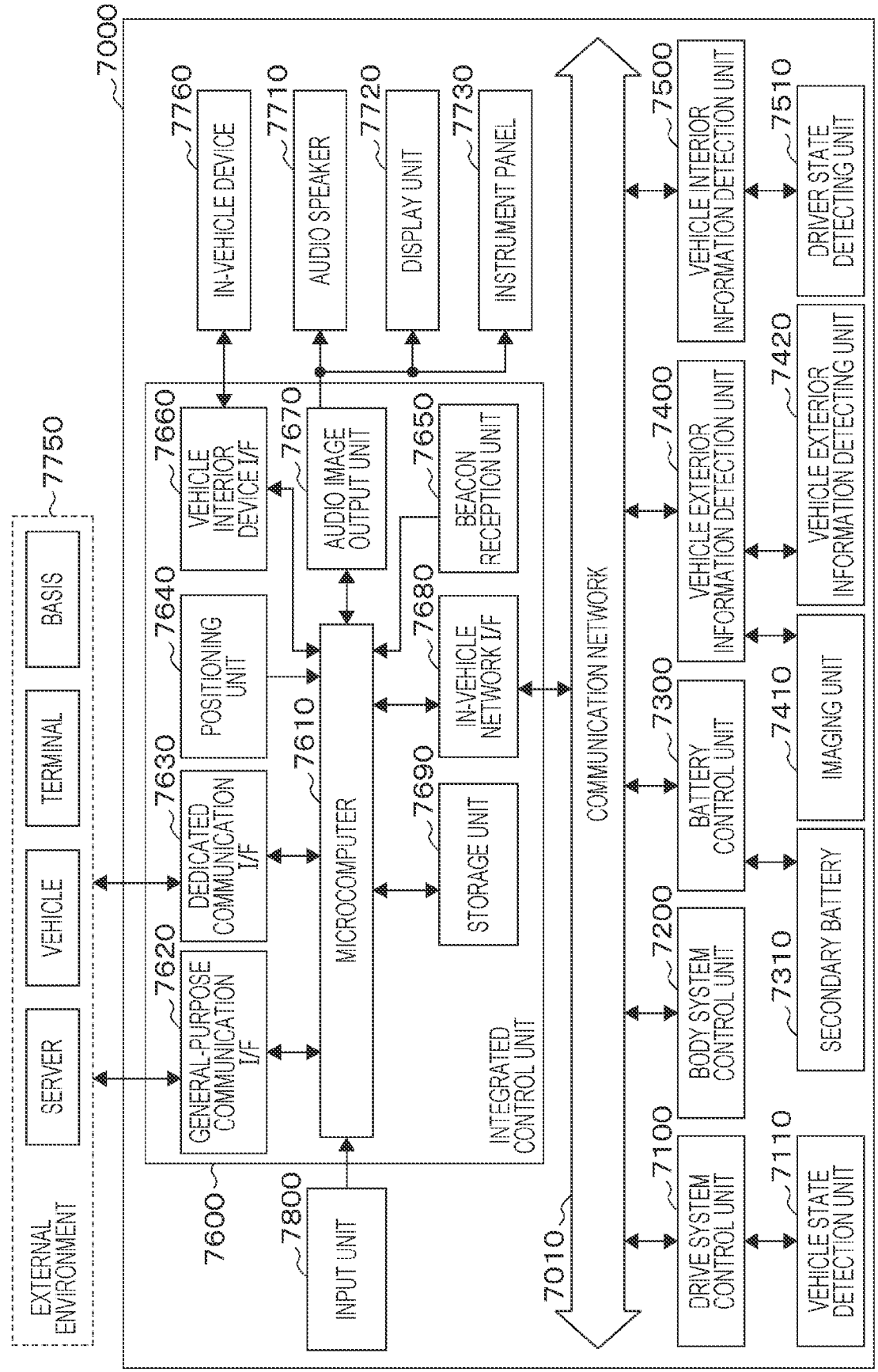
FIG. 18 is a block diagram illustrating a schematic configuration example of a vehicle control system that is an example of a mobile body control system to which the technology according to the present disclosure can be applied.

FIG. 18 is a block diagram illustrating a schematic configuration example of a vehicle control system 7000 that is an example of a mobile body control system to which the technology according to the present disclosure can be applied. The vehicle control system 7000 includes a plurality of electronic control units connected to each other via a communication network 7010. In the example illustrated in FIG. 18, the vehicle control system 7000 includes a drive system control unit 7100, a body system control unit 7200, a battery control unit 7300, a vehicle exterior information detection unit 7400, a vehicle interior information detection unit 7500, and an integrated control unit 7600. The communication network 7010 connecting these plural control units to each other may be, for example, an in-vehicle communication network conforming to any standard such as Controller Area Network (CAN), Local Interconnect Network (LIN), Local Area Network (LAN), or FlexRay (registered trademark).

Each control unit includes a microcomputer that performs arithmetic processing in accordance with various programs, a storage unit that stores programs executed by the microcomputer, parameters used for various calculations, or the like, and a drive circuit that drives devices to be controlled. Each control unit includes a network I/F for communicating with other control units via the communication network 7010, and a communication I/F for communicating with devices inside and outside a vehicle, a sensor, or the like by wired communication or wireless communication. FIG. 18 illustrates, as a functional configuration of the integrated control unit 7600, a microcomputer 7610, a general-purpose communication I/F 7620, a dedicated communication I/F 7630, a positioning unit 7640, a beacon reception unit 7650, a vehicle interior device I/F 7660, an audio image output unit 7670, an in-vehicle network I/F 7680, and a storage unit 7690. Similarly, the other control units each include a microcomputer, a communication I/F, a storage unit, and the like.

The drive system control unit 7100 controls operation of devices related to a drive system of a vehicle in accordance with various programs. For example, the drive system control unit 7100 functions as a control device of a driving force generating device for generating driving force of the vehicle, such as an internal combustion engine or a driving motor, a driving force transmitting mechanism for transmitting driving force to wheels, a steering mechanism for adjusting a steering angle of the vehicle, a braking device for generating braking force of the vehicle, and the like. The drive system control unit 7100 may include a function as a control device, such as Antilock Brake System (ABS) or Electronic Stability Control (ESC).

The drive system control unit 7100 is connected to a vehicle state detecting unit 7110. The vehicle state detecting unit 7110 includes, for example, at least one of a gyro sensor that detects angular velocity of axis rotational motion of a vehicle body, an acceleration sensor that detects acceleration of the vehicle, or a sensor for detecting an operation amount of the accelerator pedal, an operation amount of the brake pedal, a steering angle of the steering wheel, engine speed or wheel rotation speed, or the like. The drive system control unit 7100 performs arithmetic processing using a signal input from the vehicle state detecting unit 7110, and controls the internal combustion engine, the driving motor, the electric power steering device, the brake device, or the like.

The body system control unit 7200 controls operation of various devices equipped on the vehicle body in accordance with various programs. For example, the body system control unit 7200 functions as a control device of a keyless entry system, a smart key system, a power window device, or various lamps such as a head lamp, a back lamp, a brake lamp, a turn signal lamp, and a fog lamp. In this case, to the body system control unit 7200, a radio wave transmitted from a portable device that substitutes for a key, or signals of various switches can be input. The body system control unit 7200 accepts input of these radio waves or signals and controls the door lock device, power window device, lamp, and the like of the vehicle.

The battery control unit 7300 controls a secondary battery 7310 that is a power supply source of the driving motor in accordance with various programs. For example, information such as a battery temperature, a battery output voltage, or a battery remaining capacity is input from a battery device including the secondary battery 7310 to the battery control unit 7300. The battery control unit 7300 performs arithmetic processing using these signals, and performs temperature adjustment control of the secondary battery 7310 or control of a cooling device or the like provided in the battery device.

The vehicle exterior information detection unit 7400 detects information regarding the outside of the vehicle on which the vehicle control system 7000 is mounted. For example, at least one of an imaging unit 7410 or a vehicle exterior information detecting unit 7420 is connected to the vehicle exterior information detection unit 7400. The imaging unit 7410 includes at least one of a Time Of Flight (ToF) camera, a stereo camera, a monocular camera, an infrared camera, or other cameras. To the vehicle exterior information detecting unit 7420, for example, at least one of an environmental sensor for detecting the current climate or weather, or a peripheral information detection sensor for detecting another vehicle, an obstacle, a pedestrian, or the like around the vehicle on which the vehicle control system 7000 is mounted.

The environmental sensor may be, for example, at least one of a raindrop sensor that detects rainy weather, a fog sensor that detects fog, a sunshine sensor that detects sunshine degree, or a snow sensor that detects snowfall. The peripheral information detection sensor may be at least one of an ultrasonic sensor, a radar device, or a Light Detection and Ranging (LIDAR) device (Laser Imaging Detection and Ranging (LIDAR) device). The imaging unit 7410 and the vehicle exterior information detecting unit 7420 may be provided as independent sensors or devices, respectively, or may be provided as a device in which a plurality of sensors or devices is integrated together.

Figure 19:
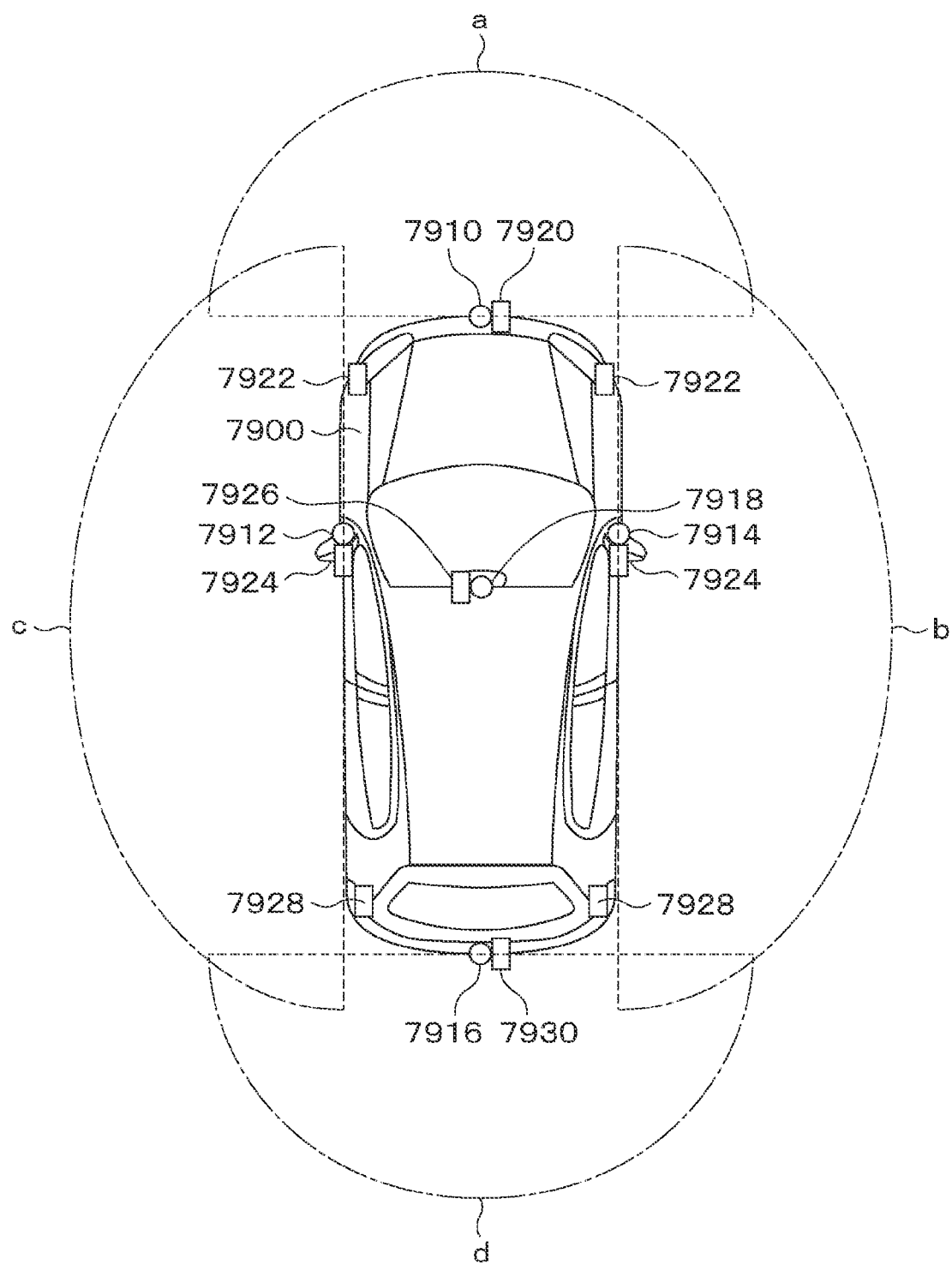
FIG. 19 is a diagram illustrating an example of installation positions of an imaging unit in a vehicle control system.

Here, FIG. 19 illustrates an example of installation positions of the imaging unit 7410 and the vehicle exterior information detecting unit 7420. Imaging units 7910, 7912, 7914, 7916, and 7918 are provided at, for example, at least one position of the front nose, the side mirror, the rear bumper, the back door, the upper part of the windshield in the vehicle interior, of a vehicle 7900. The imaging unit 7910 provided at the front nose and the imaging unit 7918 provided at the upper part of the windshield in the vehicle interior mainly acquire images ahead of the vehicle 7900. The imaging units 7912 and 7914 provided at the side mirrors mainly acquire images on the sides of the vehicle 7900. The imaging unit 7916 provided at the rear bumper or the back door mainly acquires an image behind the vehicle 7900. The imaging unit 7918 provided on the upper part of the windshield in the vehicle interior is mainly used for detecting a preceding vehicle, a pedestrian, an obstacle, a traffic signal, a traffic sign, a lane, or the like.

Note that, FIG. 19 illustrates an example of imaging ranges of the imaging units 7910, 7912, 7914, and 7916. An imaging range a indicates an imaging range of the imaging unit 7910 provided at the front nose, imaging ranges b and c respectively indicate imaging ranges of the imaging units 7912 and 7914 provided at the side mirrors, an imaging range d indicates an imaging range of the imaging unit 7916 provided at the rear bumper or the back door. For example, image data captured by the imaging units 7910, 7912, 7914, and 7916 are superimposed on each other, whereby an overhead image is obtained of the vehicle 7900 viewed from above.

Vehicle exterior information detecting units 7920, 7922, 7924, 7926, 7928, and 7930 provided on the front, rear, side, corner, upper part of the windshield in the vehicle interior of the vehicle 7900 may be ultrasonic sensors or radar devices, for example. The vehicle exterior information detecting units 7920, 7926, and 7930 provided on the front nose, rear bumper, back door, and upper part of the windshield in the vehicle interior of the vehicle 7900 may be LIDAR devices, for example. These vehicle exterior information detecting units 7920 to 7930 are mainly used for detecting a preceding vehicle, a pedestrian, an obstacle, or the like.

Referring back to FIG. 18, the description will be continued. The vehicle exterior information detection unit 7400 causes the imaging unit 7410 to capture an image outside the vehicle and receives the image data captured. Furthermore, the vehicle exterior information detection unit 7400 receives detected information from the connected vehicle exterior information detecting unit 7420. In a case where the vehicle exterior information detecting unit 7420 is an ultrasonic sensor, a radar device, or a LIDAR device, the vehicle exterior information detection unit 7400 transmits ultrasonic waves, electromagnetic waves, or the like, and receives information regarding received reflected waves. The vehicle exterior information detection unit 7400 may perform object detection processing or distance detection processing on a person, a car, an obstacle, a sign, a character on a road surface, or the like, on the basis of the received information. The vehicle exterior information detection unit 7400 may perform environment recognition processing for recognizing rainfall, fog, road surface condition, or the like on the basis of the received information. The vehicle exterior information detection unit 7400 may calculate a distance to an object outside the vehicle on the basis of the received information.

Furthermore, the vehicle exterior information detection unit 7400 may perform distance detection processing or image recognition processing for recognizing a person, a car, an obstacle, a sign, a character on a road surface, or the like, on the basis of the received image data. The vehicle exterior information detection unit 7400 may perform processing such as distortion correction or alignment on the received image data, and synthesize the image data captured by different imaging units 7410 to generate an overhead image or a panoramic image. The vehicle exterior information detection unit 7400 may perform viewpoint conversion processing using the image data captured by different imaging units 7410.

The vehicle interior information detection unit 7500 detects information regarding the inside of the vehicle. The vehicle interior information detection unit 7500 is connected to, for example, a driver state detecting unit 7510 that detects a state of a driver. The driver state detecting unit 7510 may include a camera that captures an image of the driver, a biometric sensor that detects biological information of the driver, a microphone that collects sound in the vehicle interior, and the like. The biometric sensor is provided, for example, on a seat surface, a steering wheel, or the like, and detects biological information of an occupant sitting on a seat or a driver holding the steering wheel. The vehicle interior information detection unit 7500 may calculate a degree of fatigue or a degree of concentration of the driver on the basis of detected information input from the driver state detecting unit 7510, and may determine whether or not the driver is dozing. The vehicle interior information detection unit 7500 may perform noise canceling processing or the like on a collected sound signal.

The integrated control unit 7600 controls overall operation in the vehicle control system 7000 in accordance with various programs. The integrated control unit 7600 is connected to an input unit 7800. The input unit 7800 is implemented by a device, for example, a touch panel, a button, a microphone, a switch, a lever, or the like to which input operation by the occupant can be performed. Data obtained by performing voice recognition on the sound input by the microphone may be input to the integrated control unit 7600. The input unit 7800 may be, for example, a remote control device using infrared rays or other radio waves, or an external connection device such as a mobile phone or a personal digital assistant (PDA) adaptable to the operation of the vehicle control system 7000. The input unit 7800 may be a camera, for example, and in that case, the occupant can input information by gesture. Alternatively, data may be input obtained by detecting movement of a wearable device worn by the occupant. Moreover, the input unit 7800 may include, for example, an input control circuit or the like that generates an input signal on the basis of information input by the occupant or the like using the input unit 7800, and outputs the input signal to the integrated control unit 7600. By operating the input unit 7800, the occupant or the like inputs various data to the vehicle control system 7000 or gives an instruction to perform processing operation.

The storage unit 7690 may include Read Only Memory (ROM) that stores various programs executed by the microcomputer, and Random Access Memory (RAM) that stores various parameters, calculation results, sensor values, or the like. Furthermore, the storage unit 7690 may be implemented by a magnetic storage device such as a hard disc drive (HDD), a semiconductor storage device, an optical storage device, a magneto-optical storage device, or the like.

The general-purpose communication I/F 7620 is a general-purpose communication I/F that mediates communication with various devices existing in an external environment 7750. The general-purpose communication I/F 7620 may implement a cellular communication protocol such as Global System of Mobile communications (GSM (registered trademark)), WiMAX, Long Term Evolution (LTE), or LTE-Advanced (LTE-A), or other wireless communication protocols such as a wireless LAN (also referred to as Wi-Fi (registered trademark)), and Bluetooth (registered trademark). For example, the general-purpose communication I/F 7620 may connect to a device (for example, an application server or a control server) existing on an external network (for example, the Internet, a cloud network, or a company specific network) via a base station or an access point. Furthermore, the general-purpose communication I/F 7620 may connect to a terminal existing in the vicinity of the vehicle (for example, a terminal of a driver, a pedestrian, or a shop, or a Machine Type Communication (MTC) terminal) by using a Peer To Peer (P2P) technology, for example.

The dedicated communication I/F 7630 is a communication I/F supporting a communication protocol formulated for use in vehicles. For example, the dedicated communication I/F 7630 may implement a standard protocol such as Wireless Access in Vehicle Environment (WAVE) that is a combination of IEEE 802.11p of the lower layer and IEEE 1609 of the upper layer, Dedicated Short Range Communications (DSRC), or a cellular communication protocol. The dedicated communication I/F 7630 typically performs V2X communication that is a concept including one or more of Vehicle to Vehicle communication, Vehicle to Infrastructure communication, Vehicle to Home communication, and Vehicle to Pedestrian communication.

For example, the positioning unit 7640 receives a Global Navigation Satellite System (GNSS) signal (for example, a Global Positioning System (GPS) signal from a GPS satellite) from a GNSS satellite to execute positioning, and generates position information including the latitude, longitude, and altitude of the vehicle. Note that, the positioning unit 7640 may specify the current position by exchanging signals with a wireless access point, or may acquire the position information from a terminal such as a mobile phone, a PHS, or a smartphone having a positioning function.

The beacon reception unit 7650 receives radio waves or electromagnetic waves transmitted from a wireless station or the like installed on a road, for example, and acquires information such as the current position, congestion, road closure, or required time. Note that, the function of the beacon reception unit 7650 may be included in the dedicated communication I/F 7630 described above.

The vehicle interior device I/F 7660 is a communication interface that mediates connection between the microcomputer 7610 and various vehicle interior devices 7760 existing in the vehicle. The vehicle interior device I/F 7660 may establish a wireless connection using a wireless communication protocol such as a wireless LAN, Bluetooth (registered trademark), near field communication (NFC), or Wireless USB (WUSB). Furthermore, the vehicle interior device I/F 7660 may establish a wired connection such as a Universal Serial Bus (USB), High-Definition Multimedia Interface (HDMI) (registered trademark), or Mobile High-definition Link (MHL) via a connection terminal (and a cable if necessary) not illustrated. The vehicle interior device 7760 may include, for example, at least one of a mobile device or a wearable device possessed by the occupant, or an information device carried in or attached to the vehicle.

Furthermore, the vehicle interior device 7760 may include a navigation device that performs a route search to any destination. The vehicle interior device I/F 7660 exchanges control signals or data signals with these vehicle interior devices 7760.

The in-vehicle network I/F 7680 is an interface that mediates communication between the microcomputer 7610 and the communication network 7010. The in-vehicle network I/F 7680 transmits and receives signals and the like in accordance with a predetermined protocol supported by the communication network 7010.

The microcomputer 7610 of the integrated control unit 7600 controls the vehicle control system 7000 in accordance with various programs on the basis of information acquired via at least one of the general-purpose communication I/F 7620, the dedicated communication I/F 7630, the positioning unit 7640, the beacon reception unit 7650, the vehicle interior device I/F 7660, or the in-vehicle network I/F 7680. For example, the microcomputer 7610 may calculate a control target value of the driving force generating device, the steering mechanism, or the braking device on the basis of acquired information inside and outside the vehicle, and output a control command to the drive system control unit 7100. For example, the microcomputer 7610 may perform cooperative control aiming for implementing functions of advanced driver assistance system (ADAS) including collision avoidance or shock mitigation of the vehicle, follow-up traveling based on an inter-vehicle distance, vehicle speed maintaining traveling, vehicle collision warning, vehicle lane departure warning, or the like. Furthermore, the microcomputer 7610 may perform cooperative control aiming for automatic driving or the like that autonomously travels without depending on operation of the driver, by controlling the driving force generating device, the steering mechanism, the braking device, or the like on the basis of acquired information around the vehicle.

The microcomputer 7610 may generate three-dimensional distance information between the vehicle and an object such as a surrounding structure or a person on the basis of information acquired via at least one of the general-purpose communication I/F 7620, the dedicated communication I/F 7630, the positioning unit 7640, the beacon reception unit 7650, the vehicle interior device I/F 7660, or the in-vehicle network I/F 7680, and create local map information including peripheral information of the current position of the vehicle. Furthermore, on the basis of the acquired information, the microcomputer 7610 may predict danger such as collision of a vehicle, approach of a pedestrian or the like, or entry into a road closed, and generate a warning signal. The warning signal may be, for example, a signal for generating a warning sound or for turning on a warning lamp.

The audio image output unit 7670 transmits an output signal of at least one of the audio or image to an output device capable of visually or aurally notifying an occupant in the vehicle or the outside of the vehicle of information. In the example of FIG. 18, as the output device, an audio speaker 7710, a display unit 7720, and an instrument panel 7730 are illustrated. The display unit 7720 may include, for example, at least one of an on-board display or a head-up display. The display unit 7720 may have an Augmented Reality (AR) display function. The output device may be another device other than these devices, such as a lamp, a projector, or a wearable device such as a headphone and an eyeglass type display worn by the occupant. In a case where the output device is a display device, the display device visually displays results obtained by the various types of processing performed by the microcomputer 7610 or information received from the other control units in various formats such as text, an image, a table, or a graph. Furthermore, in a case where the output device is an audio output device, the audio output device converts an audio signal including reproduced audio data, acoustic data, and the like into an analog signal to aurally output the analog signal.

Note that, in the example illustrated in FIG. 18, at least two control units connected together via the communication network 7010 may be integrated as one control unit. Alternatively, each control unit may be configured by plural control units. Moreover, the vehicle control system 7000 may include another control unit not illustrated. Furthermore, in the above description, some or all of the functions performed by any of the control units may be performed by another control unit. That is, as long as information is transmitted and received via the communication network 7010, predetermined arithmetic processing may be performed by any of the control units. Similarly, a sensor or device connected to any of the control units may be connected to another control unit, and plural control units may mutually transmit and receive detected information via the communication network 7010.

In the above, an example has been described of the vehicle control system to which the technology according to the present disclosure can be applied. The technology according to the present disclosure can be applied to, for example, the imaging units 7910, 7912, 7914, 7916, and 7918, and the like, in the configuration described above. Specifically, the imaging system of the present disclosure can be applied to these imaging units. The imaging system of the present disclosure can predict in advance a dangerous state such as another vehicle suddenly interrupting in front of the subject vehicle during traveling, so that it is possible to prevent collision accidents and the like and contribute to maintenance of safe vehicle driving.

<Configuration that can be Adopted by Present Disclosure>

Note that, the present disclosure can also adopt the following configurations.

<<A. Imaging System>>

[A-1] An imaging system including:
  an event detection sensor that detects an event;
  an object recognition unit that performs recognition processing for an object detected as the event on the basis of an event signal output from the event detection sensor;
  a motion vector estimation unit that estimates a motion vector of the object on the basis of a recognition result by the object recognition unit; and a control unit that outputs warning information for warning that a dangerous state has occurred on the basis of an estimation result by the motion vector estimation unit.

[A-2] The imaging system according to [A-1], in which
  the event detection sensor includes an asynchronous imaging device that detects as an event that a change in brightness in a pixel that photoelectrically converts incident light exceeds a predetermined threshold value.

[A-3] The imaging system according to [A-2], in which
  the imaging system is used by being mounted on a mobile body.

[A-4] The imaging system according to any of [A-1] to [A-3], in which
  the motion vector estimation unit detects the motion vector between imaging frames to estimate motion of the object in a screen.

[A-5] The imaging system according to any of [A-1] to [A-4], further including an image sensor that performs imaging at a predetermined frame rate.

[A-6] The imaging system according to [A-5], in which
the object recognition unit performs event recognition processing using image data in a frame format output from the image sensor.

[A-7] The imaging system according to any of [A-1] to [A-6], in which
the control unit determines vehicle interruption as a dangerous state.

[A-8] The imaging system according to [A-7], in which
the control unit detects the vehicle interruption on the basis of a movement vector of a center of gravity of the object.

[A-9] The imaging system according to [A-8], in which
the control unit detects the vehicle interruption when the movement vector of the center of gravity of the object is toward a center of an angle of view and a magnitude of the movement vector is a predetermined threshold value.

[A-10] The imaging system according to [A-7], in which
the control unit detects the vehicle interruption on the basis of a ratio of the object occupying an angle of view of the event detection sensor, and a movement vector of a center of gravity of the object.

[A-11] The imaging system according to [A-10], in which
the control unit detects the vehicle interruption when the ratio of the object occupying the angle of view of the event detection sensor is greater than or equal to a certain ratio, and the movement vector of the center of gravity of the object is toward a center of the angle of view, and a magnitude of the movement vector is a predetermined threshold value.

[A-12] The imaging system according to any of [A-1] to [A-6], in which
the control unit controls a characteristic of the event detection sensor when the ratio of the object occupying the angle of view of the event detection sensor is greater than or equal to a certain ratio, and the movement vector of the center of gravity of the object is toward a center of the angle of view, and a magnitude of the movement vector is a predetermined threshold value.

[A-13] The imaging system according to [A-12], in which
the characteristic of the event detection sensor is a resolution of the event detection sensor.

[A-14] The imaging system according to [A-12], in which
the characteristic of the event detection sensor is a detection sensitivity of event detection.

REFERENCE SIGNS LIST

1 Imaging system
10 Event detection sensor
11 Pixel
12 Pixel array unit
13 Drive unit
14 Arbiter unit (arbitration unit)
15 Column processing unit
16 Signal processing unit
20 Image sensor
21 Pixel
22 Pixel array unit
23 Row selection unit
24 Constant current source unit
25 Analog-digital conversion unit
26 Horizontal transfer scanning unit
27 Signal processing unit
28 Timing control unit
30 Motion recognition unit
40 Object recognition unit
50 Motion vector estimation unit
60 Control unit
70 Operation pattern definition unit
80 Recording unit
90 Interface

The invention claimed is:

1. An imaging system, comprising:
an event detection sensor configured to:
 detect an event corresponding to an object; and
 output an event signal based on the detected event;
an object recognition unit configured to:
 execute a recognition process for the object based on the event signal; and
 output a recognition result based on the execution of the recognition process;
a motion vector estimation unit configured to estimate a motion vector of the object based on the recognition result; and
a control unit configured to:
 output warning information based on the motion vector of the object, wherein the warning information indicates an occurrence of a dangerous state;
 determine that a ratio of an occupancy, of an angle of view of the event detection sensor, by the object is one of greater than or equal to a certain ratio;
 determine that a movement vector of a center of gravity of the object is toward a center of the angle of view of the event detection sensor;
 determine that a magnitude of the movement vector is one of greater than or equal to a first threshold value; and
 control a characteristic of the event detection sensor based on each of:
  the determination that the ratio of the occupancy, of the angle of view, by the object is one of greater than or equal to the certain ratio,
  the determination that the movement vector of the center of gravity of the object is toward the center of the angle of view, and
  the determination that the magnitude of the movement vector is one of greater than or equal to the first threshold value.

2. The imaging system according to claim 1, wherein
the event detection sensor includes an asynchronous imaging device,
the asynchronous imaging device includes a pixel configured to photoelectrically convert incident light, and
the asynchronous imaging device is configured to detect, as the event, that a change in brightness in the pixel exceeds a second threshold value.

3. The imaging system according to claim 2, wherein the imaging system is on a mobile body.

4. The imaging system according to claim 1, wherein the motion vector estimation unit is further configured to:
detect the motion vector between imaging frames; and
estimate motion of the object in a screen based on the detection of the motion vector.

5. The imaging system according to claim 1, further comprising an image sensor configured to image at a frame rate.

6. The imaging system according to claim 5, wherein
the image sensor is further configured to output image data in a frame format, and
the object recognition unit is further configured to execute an event recognition process based on the image data.

7. The imaging system according to claim 1, wherein the control unit is further configured to determine a vehicle interruption as the dangerous state.

8. The imaging system according to claim 7, wherein the control unit is further configured to detect-detects the vehicle interruption based on the movement vector of the center of gravity of the object.

9. The imaging system according to claim 8, wherein the control unit is further configured to detect the vehicle interruption based on each of:
    the determination that the movement vector of the center of gravity of the object is toward the center of the angle of view, and
    the determination that the magnitude of the movement vector is one of greater than or equal to the first threshold value.

10. The imaging system according to claim 7, wherein the control unit is further configured to detect the vehicle interruption based on each of:
    the ratio of the occupancy, of the angle of view of the event detection sensor, by the object, and
    the movement vector of the center of gravity of the object.

11. The imaging system according to claim 1, wherein the characteristic of the event detection sensor is a resolution of the event detection sensor.

12. The imaging system according to claim 1, wherein the characteristic of the event detection sensor is a detection sensitivity of event detection.

13. An imaging system, comprising:
    an event detection sensor configured to:
        detect an event corresponding to an object; and
        output an event signal based on the detected event;
    a motion recognition unit configured to:
        generate a plurality of event frames based on the event signal;
        detect motion of the object based on the plurality of event frames; and
        output a motion detection result based on the detection of the motion of the object;
    an object recognition unit configured to:
        execute a recognition process for the object based on the motion detection result; and
        output a recognition result based on the execution of the recognition process; and
    a control unit configured to:
        measure a center of gravity of the object based on the recognition result;
        determine that a movement vector of the center of gravity of the object is toward a center of an angle of view of the event detection sensor;
        determine that a ratio of an occupancy, of the angle of view, by the object is one of greater than or equal to a certain ratio;
        determine that a magnitude of the movement vector is one of greater than or equal to a threshold value;
        detect a vehicle interruption based on each of:
            the determination that the ratio of the occupancy, of the angle of view, by the object is one of greater than or equal to the certain ratio,
            the determination that the movement vector of the center of gravity of the object is toward the center of the angle of view, and
            the determination that the magnitude of the movement vector is one of greater than or equal to the threshold value; and
        output warning information based on the detection of the vehicle interruption, wherein the warning information indicates an occurrence of a dangerous state.

* * * * *